United States Patent
Bickerstaff et al.

(10) Patent No.: US 10,054,796 B2
(45) Date of Patent: Aug. 21, 2018

(54) DISPLAY

(71) Applicant: Sony Interactive Entertainment Europe Limited, London (GB)

(72) Inventors: Ian Henry Bickerstaff, London (GB); Simon Mark Benson, London (GB); Oliver Mark Wright, London (GB); Sharwin Winesh Raghoebardajal, London (GB)

(73) Assignee: Sony Interactive Entertainment Europe Limited (GB)

( * ) Notice: Subject to any disclaimer, the term of this patent is extended or adjusted under 35 U.S.C. 154(b) by 166 days.

(21) Appl. No.: 14/778,867

(22) PCT Filed: Mar. 24, 2014

(86) PCT No.: PCT/GB2014/050905
§ 371 (c)(1),
(2) Date: Sep. 21, 2015

(87) PCT Pub. No.: WO2014/155072
PCT Pub. Date: Oct. 2, 2014

(65) Prior Publication Data
US 2016/0246061 A1    Aug. 25, 2016

(30) Foreign Application Priority Data

Mar. 25, 2013 (GB) .................................. 1305402.8
May 7, 2013 (GB) .................................. 1308151.8
Mar. 17, 2014 (GB) .................................. 1404739.3

(51) Int. Cl.
G02B 27/01    (2006.01)
H04N 5/232    (2006.01)
G06F 3/01    (2006.01)

(52) U.S. Cl.
CPC ....... G02B 27/0179 (2013.01); G02B 27/017 (2013.01); G06F 3/012 (2013.01);
(Continued)

(58) Field of Classification Search
None
See application file for complete search history.

(56) References Cited

U.S. PATENT DOCUMENTS 4,695,129 A    9/1987 Faessen et al.
5,566,073 A    10/1996 Margolin
(Continued)

FOREIGN PATENT DOCUMENTS

EP    1731943 A1    12/2006
EP    2211224 A1    7/2010
(Continued)

OTHER PUBLICATIONS

British Examination Report for Application No. GB1308151.8 dated Feb. 2, 2015.
(Continued)

Primary Examiner — Mark Zimmerman
Assistant Examiner — Nurun N Flora
(74) Attorney, Agent, or Firm — Lerner, David, Littenberg, Krumholz & Mentlik, LLP

(57) ABSTRACT

A display method is provided using a display that is operable to display an image to a viewer. The display method includes detecting one or both of an initial position and/or orientation of the viewer's head, and generating an image for display according to the detected position and/or orientation. A current position and/or orientation of the viewer's head are detected at a time at which the image is to be displayed. The method also includes re-projecting the generated image according to any differences between the initial position and/or orientation and the current position and/or orientation
(Continued)

of the viewer's head, and displaying the re-projected image using the display.

23 Claims, 21 Drawing Sheets

(52) U.S. Cl.
CPC ..... *H04N 5/23238* (2013.01); *H04N 5/23254* (2013.01); *H04N 5/23258* (2013.01); *H04N 5/23267* (2013.01); *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 5,742,264 A | 4/1998 | Inagaki et al. | |
| 7,312,766 B1* | 12/2007 | Edwards | G02B 27/017 248/115 |
| 2001/0010546 A1* | 8/2001 | Chen | H04N 5/23293 348/218.1 |
| 2004/0227908 A1* | 11/2004 | Wada | H04N 5/74 353/94 |
| 2005/0156817 A1* | 7/2005 | Iba | G02B 27/0093 345/8 |
| 2006/0044289 A1* | 3/2006 | Yee | G09G 5/006 345/204 |
| 2007/0273610 A1* | 11/2007 | Baillot | G02B 27/017 345/8 |
| 2010/0157433 A1 | 6/2010 | Mukawa et al. | |
| 2012/0188148 A1 | 7/2012 | DeJong | |
| 2012/0236031 A1* | 9/2012 | Haddick | G02B 27/0093 345/633 |
| 2012/0274750 A1* | 11/2012 | Strong | G01C 21/165 348/52 |
| 2013/0076921 A1* | 3/2013 | Owen | H04N 5/23258 348/208.4 |
| 2013/0113973 A1* | 5/2013 | Miao | G09G 3/003 348/333.01 |
| 2013/0135303 A1* | 5/2013 | Densham | G06T 17/00 345/420 |
| 2014/0098137 A1* | 4/2014 | Fein | G06T 11/60 345/633 |
| 2014/0240469 A1* | 8/2014 | Lee | H04N 13/025 348/48 |

FOREIGN PATENT DOCUMENTS

| | | |
|---|---|---|
| KR | 101180119 B1 | 9/2012 |
| WO | 0122149 A1 | 3/2001 |
| WO | 2013021458 A1 | 2/2013 |
| WO | 2013125921 A1 | 8/2013 |

OTHER PUBLICATIONS

British Search Report for Application No. GB1305402.8 dated Sep. 10, 2014.
British Search Report for Application No. GB1308151.8 dated Nov. 13, 2013.
British Search Report for Application No. GB1404739.3 dated Jun. 30, 2014.
International Search Report and Written Opinion for Application No. PCT/GB2014/050905 dated Sep. 9, 2014.
Partial International Search Report for Application No. PCT/GB2014/050905 dated Jul. 28, 2014.
Examination Report for Application No. GB1404739.3, dated Mar. 31, 2017.

* cited by examiner

LEFT                RIGHT

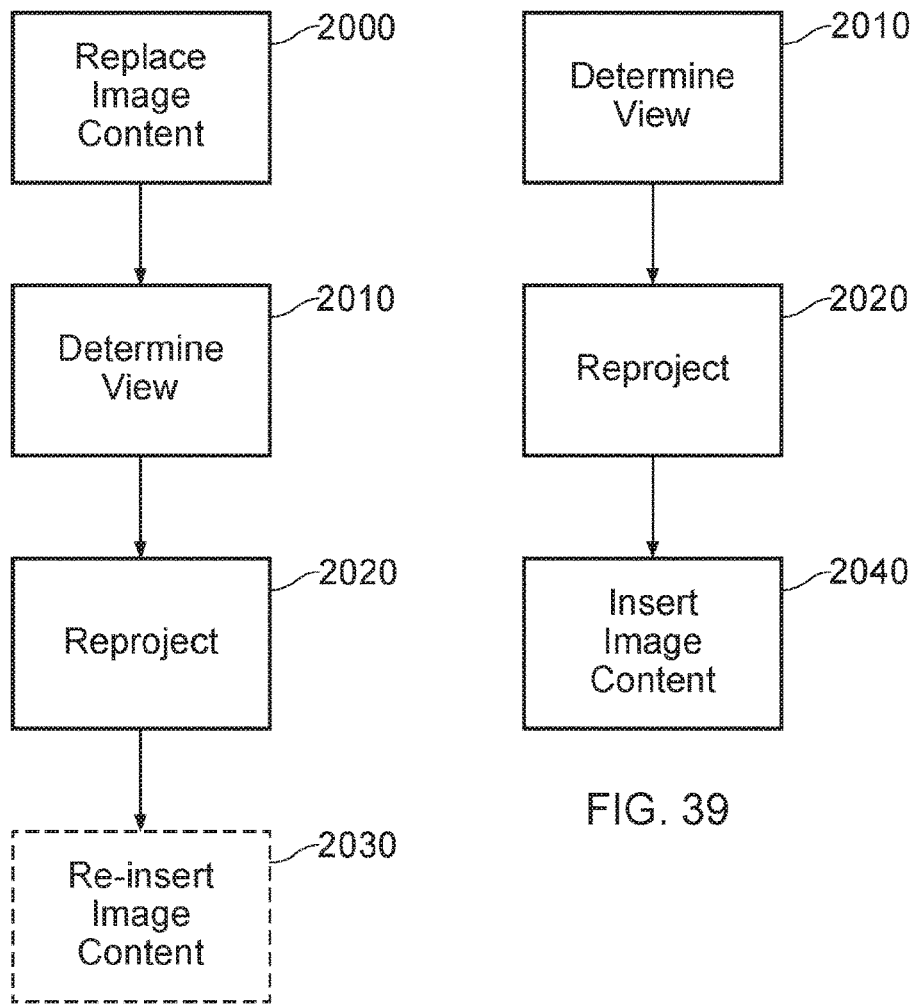
FIG. 38
FIG. 39
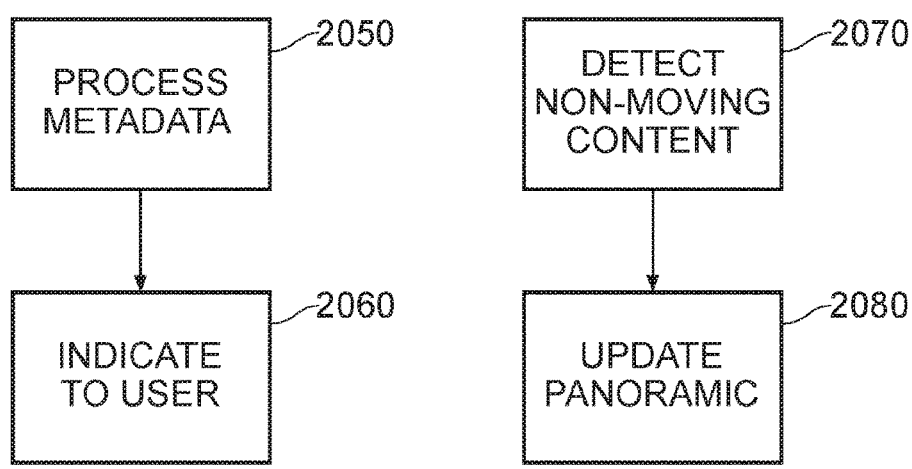
FIG. 40
FIG. 41

DISPLAY

CROSS REFERENCE TO RELATED APPLICATIONS

The present application is a national phase entry under 35 U.S.C. § 371 of International Application No. PCT/GB2014/050905 filed Mar. 24, 2014, published in English, which claims the benefit of and priority to GB Patent Application Nos. 1305402.8 filed Mar. 25, 2013, 1308151.8 filed May 7, 2013, and 1404739.3 filed Mar. 17, 2014, the entire disclosures of which are hereby incorporated by reference herein.

This disclosure relates to displays.

As background, an example head-mountable display (HMD) will be discussed, although (as described further below) the disclosure is applicable to other types of displays.

An HMD is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the contents of which are incorporated herein by reference, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

This disclosure provides a display method using a display operable to display an image to a viewer, the method comprising: detecting an initial position and/or orientation of the viewer's head; generating an image for display according to the detected position and/or orientation; detecting a current position and/or orientation of the viewer's head at a time at which the image is to be displayed; re-projecting the generated image according to any differences between the initial position and/or orientation and the current position and/or orientation of the viewer's head; and displaying the re-projected image using the display.

Further respective aspects and features of the disclosure are defined in the appended claims.

Embodiments of the disclosure will now be described with reference to the accompanying drawings, in which:

FIG. 1 schematically illustrates an HMD worn by a user;

FIG. 2 is a schematic plan view of an HMD;

FIG. 3 schematically illustrates the formation of a virtual image by an HMD;

FIG. 4 schematically illustrates another type of display for use in an HMD;

FIG. 5 schematically illustrates a pair of stereoscopic images;

FIG. 6 schematically illustrates a change of view of user of an HMD;

FIGS. 7a and 7b schematically illustrate HMDs with motion sensing;

FIG. 8 schematically illustrates a position sensor based on optical flow detection;

FIG. 9 schematically illustrates the generation of images in response to HMD position or motion detection;

FIG. 10 schematically illustrates the capture of an image by a camera;

FIG. 11 schematically illustrates the re-projection of the captured image;

FIG. 12 schematically illustrates an image rotation;

FIG. 13 schematically illustrates an image rotation and translation;

FIG. 14 schematically illustrates a latency issue with HMD image display;

FIG. 15 is a schematic flow chart illustrating an image processing technique;

FIG. 16 schematically illustrates the rotation of an HMD;

FIG. 17 schematically illustrates image position subtraction;

FIG. 18 schematically illustrates a depth map;

FIGS. 19 and 20 schematically illustrate images according to different respective viewpoints;

FIG. 21 schematically illustrates a technique for image rendering and re-projection to compensate for HMD motion;

FIG. 22 is a schematic flowchart relating to the technique shown in FIG. 21;

FIG. 23 schematically illustrates a technique for image capture and re-projection to compensate for different camera and HMD positions;

FIG. 24 is a schematic flowchart relating to the technique shown in FIG. 23;

FIG. 25 schematically illustrates the viewing of a panoramic image;

FIG. 26 schematically illustrates camera viewpoint adjustment in a displayed image;

FIG. 27 schematically illustrates a camera apparatus;

FIG. 28 schematically illustrates a viewer observing a display screen;

FIG. 29 schematically illustrates a user wearing a head orientation detector;

FIG. 30 schematically illustrates a passive head orientation detection technique;

FIG. 31 schematically illustrates a display arrangement using multiple screens;

FIG. 32 schematically illustrates an example of a display image;

FIG. 33 schematically illustrates a display of a sports event;

FIG. 34 schematically illustrates apparatus for generating the display of FIG. 33;

FIG. 35 schematically illustrates overlapping viewpoints;

FIGS. 36 and 37 schematically illustrate examples of image data with associated metadata;

FIGS. 38 and 39 are schematic flowcharts illustrating processes for using the metadata of FIGS. 36 and 37;

FIG. 40 is a schematic flowchart illustrating a further use of the metadata of FIGS. 36 and 37; and FIG. 41 is a schematic flowchart illustrating the updating of a panoramic view.

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
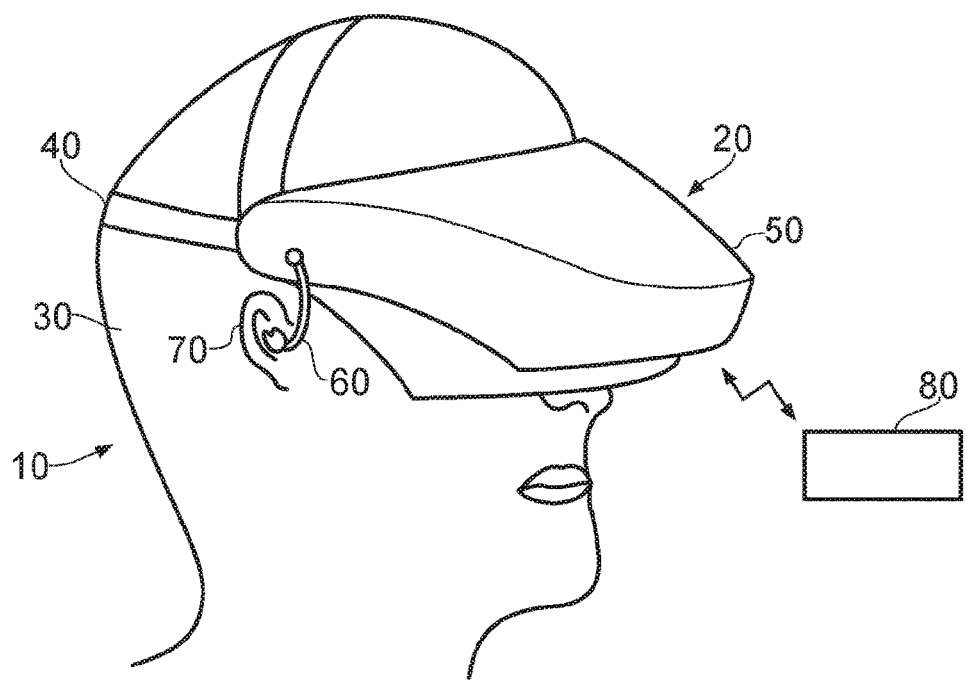

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
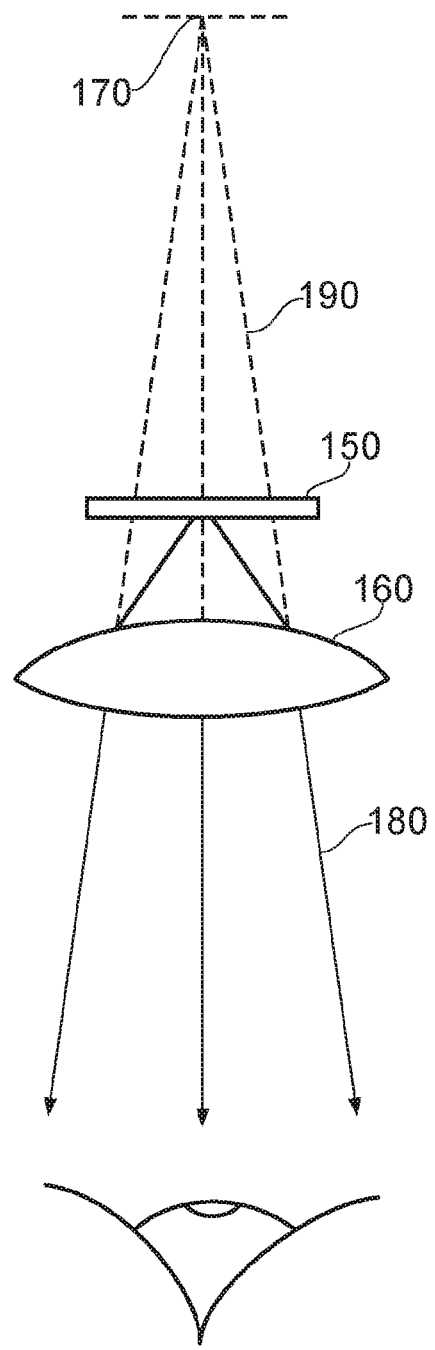

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
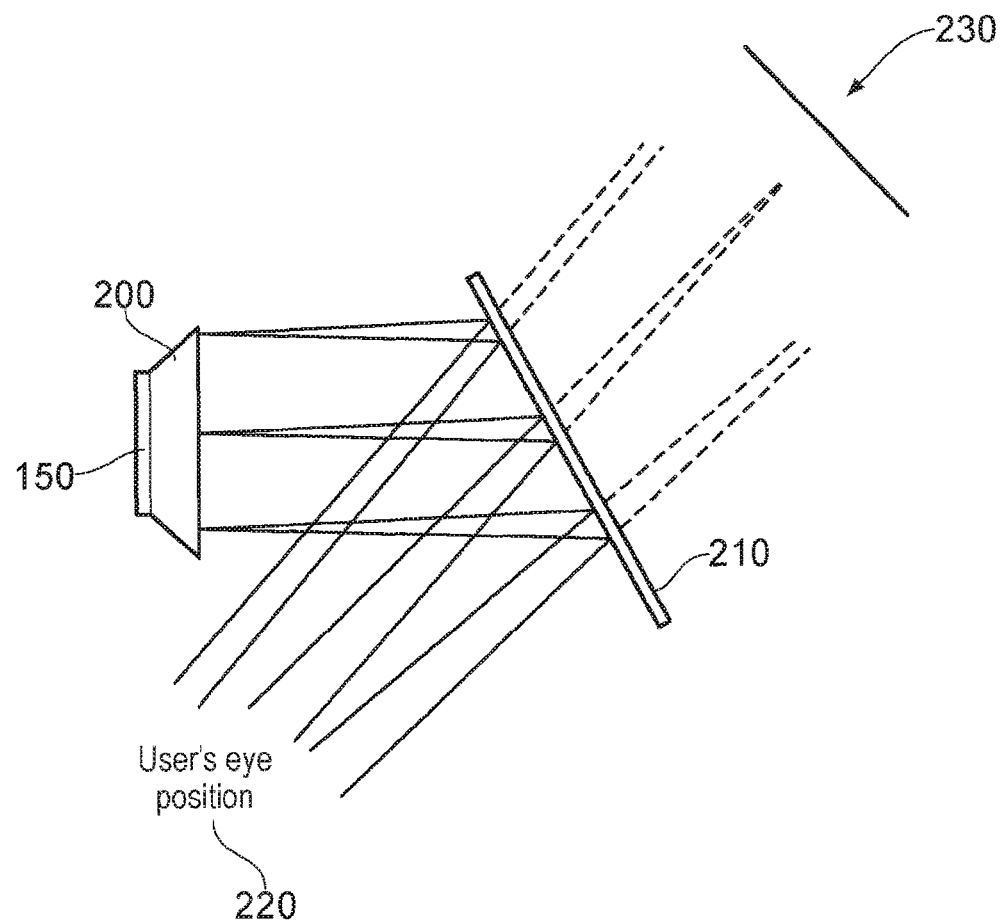

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer, In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
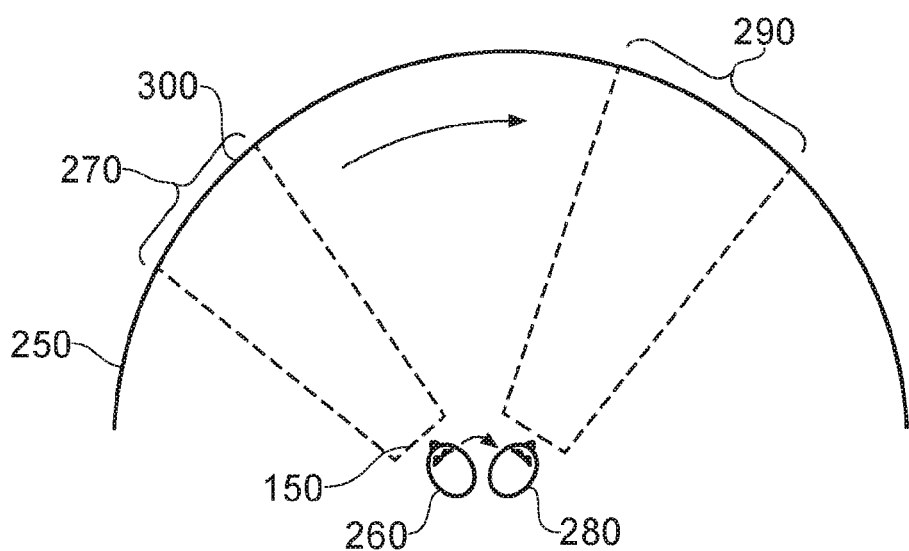

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
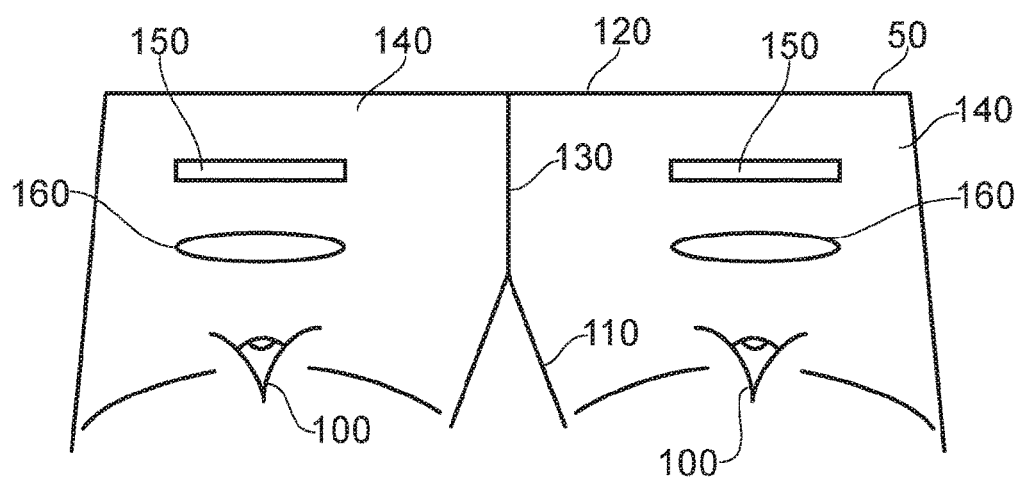
Figure 7A:
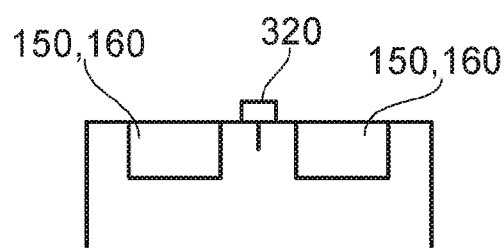
Figure 7B:
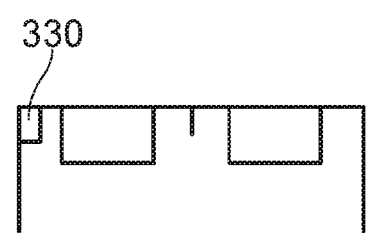

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
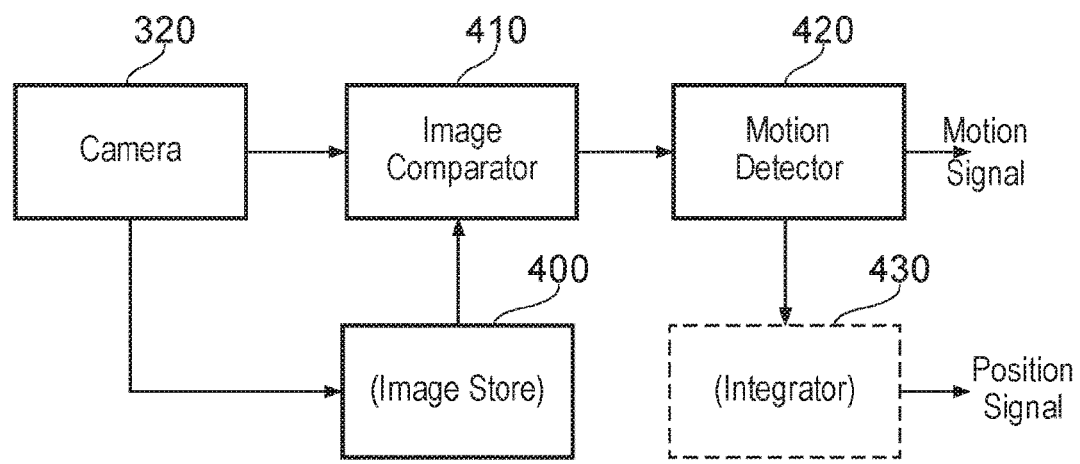

FIG. 8 schematically illustrates one example of motion detection using the camera 320 of FIG. 7a.

The camera 320 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image captured by the camera 320 has moved since the time at which the preceding image was captured. Localised motion might indicate moving objects within the field of view of the camera 320, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 330 such as an accelerometer. This can in fact give a faster response in respect of the indication of motion, given that the response time of the video-based system is at best the reciprocal of the image capture rate. In some instances, therefore, the detector 330 can be better suited for use with higher frequency motion detection. However, in other instances, for example if a high image rate camera is used (such as a 200 Hz capture rate camera), a camera-based system may be more appropriate. In terms of FIG. 8, the detector 330 could take the place of the camera 320, the image store 400 and the comparator 410, so as to provide an input directly to the motion detector 420. Or the detector 330 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 9:
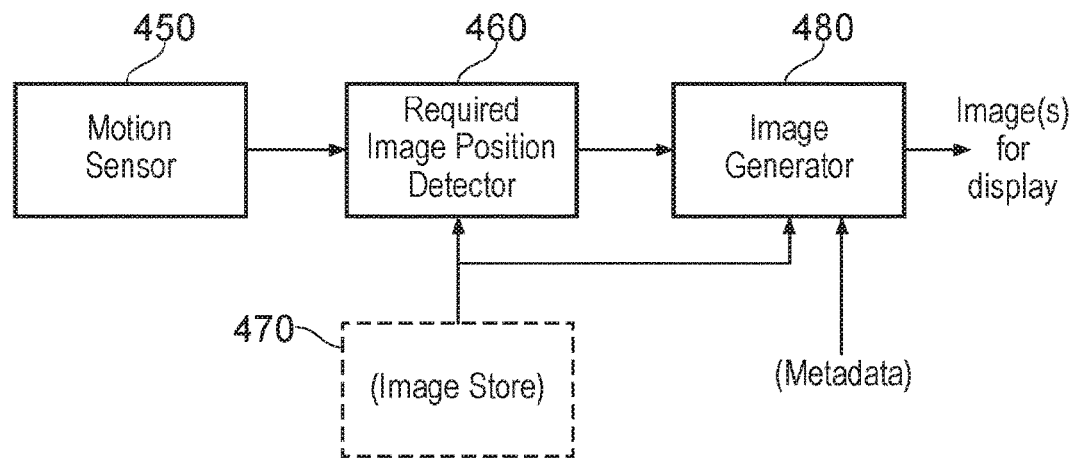

FIG. 9 schematically illustrates image processing carried out in response to a detected position or change in position of the HMD.

As mentioned above in connection with FIG. 6, in some applications such as virtual reality and augmented reality arrangements, the apparent viewpoint of the video being displayed to the user of the HMD is changed in response to a change in actual position or orientation of the user's head.

With reference to FIG. 9, this is achieved by a motion sensor 450 (such as the arrangement of FIG. 8 and/or the motion detector 330 of FIG. 7b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The image generator 480 may act on the basis of metadata such as so-called view matrix data, in a manner to be described below.

Figure 10:
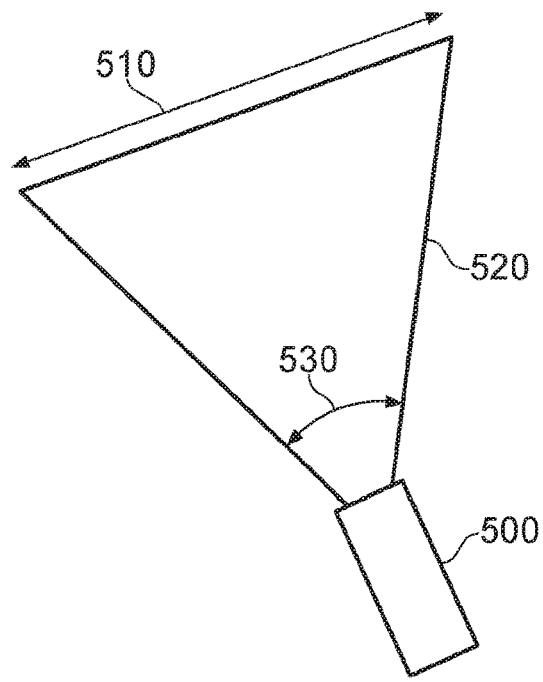
Figure 11:
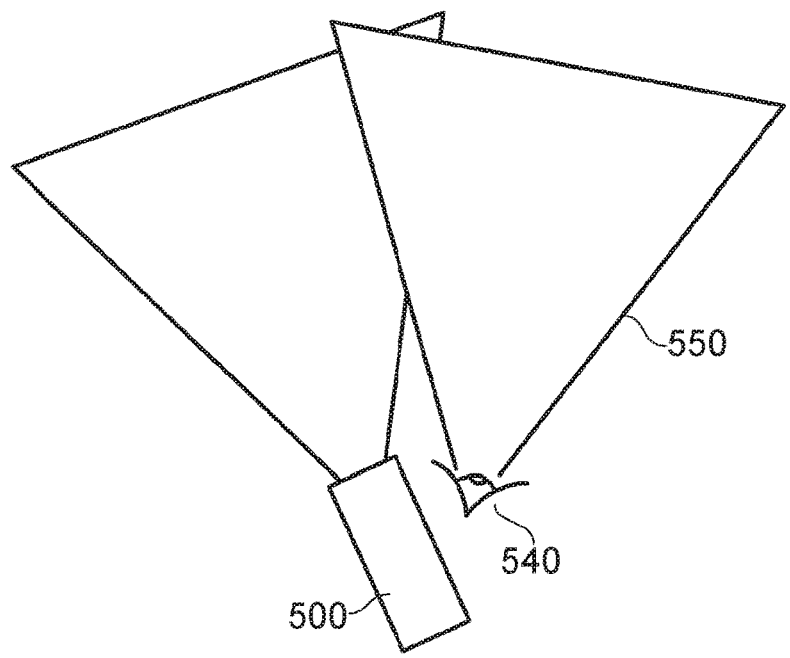

In order to illustrate schematically some of the general concepts associated with the present technology, FIG. 10 schematically illustrates the capture of an image by a camera and FIG. 11 schematically illustrates the re-projection of the captured image.

Referring to FIG. 10, a camera 500 captures an image of a portion 510 of a real-world scene. The field of view of the camera 500 is shown schematically as a generally triangular shape 520, such that the camera is at one apex of the generally triangular shape, the sides adjacent to the camera schematically indicate the left and right extremes of the field of view and the side opposite the camera schematically illustrates the portion of the scene which is captured. This schematic notation will be used in several of the following drawings.

To discuss the general concept of image re-projection, assume that in the arrangement of FIG. 10, not only the image is captured but also information defining a "view matrix" of the camera is also captured. Here, the view matrix may refer to the camera's position and/or orientation in space, either relative to a notional fixed point and orientation or expressed as changes with respect to the position and/or orientation applicable at a previous time (which may be the time associated with a preceding captured image, for example). So, in one expression, the view matrix could be considered as the x, y and z spatial position of the camera along with its rotational orientation expressed as yaw, pitch and roll (general terms indicative of three orthogonal rotational degrees of freedom) and its viewing frustum (a general term indicative of the field of view of the camera, ranging between a wide-angle field of view and a narrow angle or telephoto field of view, and which may be expressed as an angular range corresponding to, for example, the angle 530 shown in FIG. 10). The view matrix data need not comprise all of these data contributions. For example, in some arrangements, only a lateral rotational orientation (yaw) may be relevant. The choice of which data items to include within the view matrix data is therefore a matter for the system designer, taking into account the expected uses of the captured images and view matrix data.

Figure 27:
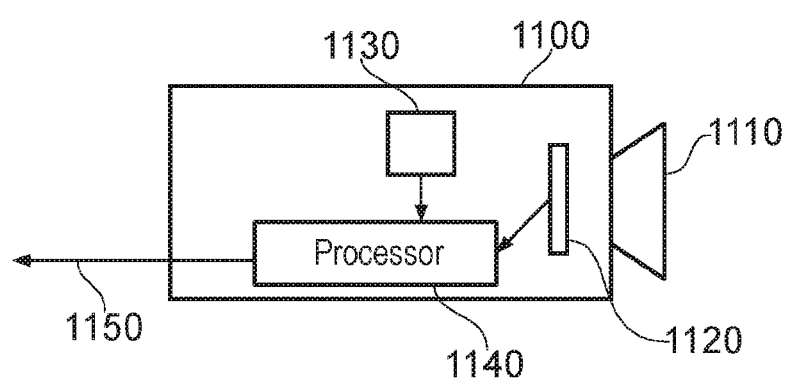

In embodiments of the disclosure, the view matrix data is stored in association with the captured image, for example as so-called metadata which is stored and/or transmitted as part of the overall image data package, for example by a camera apparatus such as that described below with reference to FIG. 27 comprising an image capture device for capturing an image; a position and/or orientation detector for detecting the position and/or orientation of the camera apparatus at the time of capture of the image; and a metadata generator for associating metadata with the image, the metadata indicating the detected position and/or orientation of the camera apparatus at the time of capture of the image.

Note that the camera 500 may be a stills camera or a video camera capturing a succession of images, separated by time intervals.

FIG. 11 schematically illustrates the re-projection of the image captured by the camera of FIG. 10 according to a viewpoint of a viewer. The viewpoint 540 is schematically illustrated by an eye symbol and a generally triangular shape 550 which is similar to the triangular shape 520 discussed above. In order to display the image captured by the camera 500 so that it is appropriate for viewing according to the viewpoint shown in FIG. 11, a process is carried out which relates the view matrix (as discussed above) of the viewpoint to the view matrix of the camera 500. Examples of such techniques will be described with reference to FIGS. 12 and 13. Further examples are discussed in Seitz: "Image Based Transformation of Viewpoint and Scene Appearance", PhD Dissertation, Computer Sciences Department Technical Report 1354, University of Wisconsin—Madison, October 1997, the content of which is incorporated herein by reference.

Figure 12:
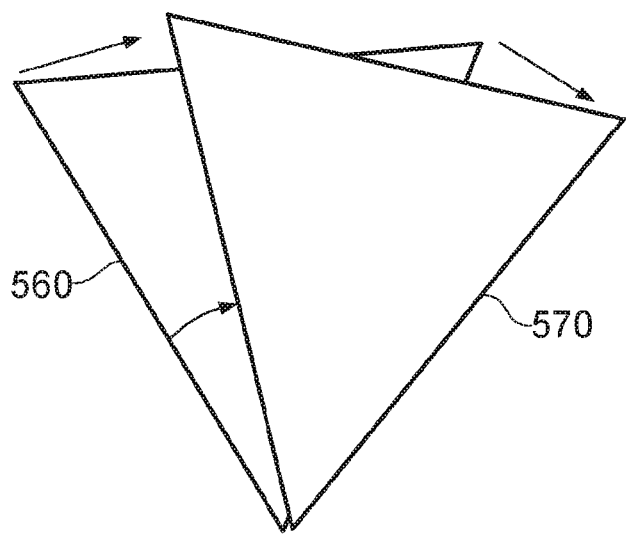

FIG. 12 schematically illustrates an image rotation from a first view matrix 560 to a second view matrix 570. Re-projection of this type involves simply rotating and scaling the image so as to correct for any differences in field of view and orientation between the view matrix of the camera and the view matrix of the user viewpoint. Examples of this type of re-projection will be discussed below with reference to FIGS. 16 and 17.

Figure 13:
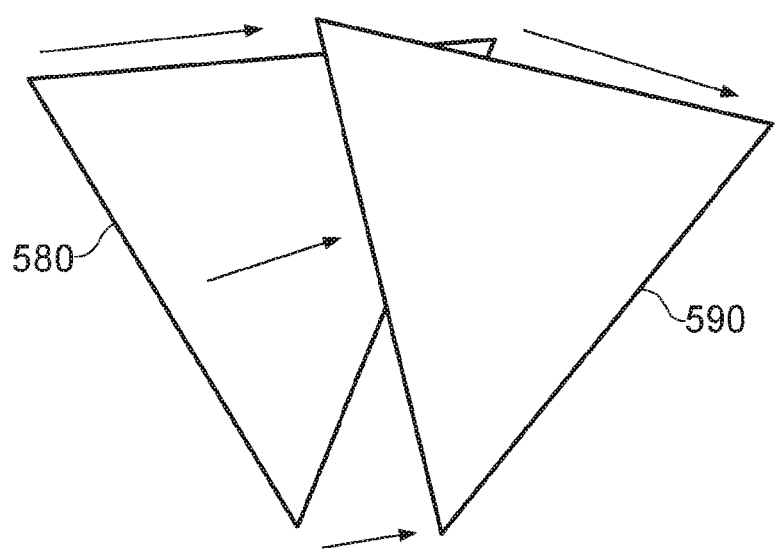

FIG. 13 schematically illustrates an image rotation and translation from a first view matrix 580 to eight second view matrix 590. Here, the processing is slightly more involved, and may also use a depth map, indicating the image depth of different image features in the captured image, to allow the user viewpoint to be translated with respect to the viewpoint of the camera. Examples of the use of a depth map will be discussed below with reference to FIGS. 18-20.

Note that the images do not have to be camera-captured images. These techniques are all equally applicable to machine-generated images such as images generated by a computer games machine for displayed to the user as part of the process of playing a computer game.

Figure 14:
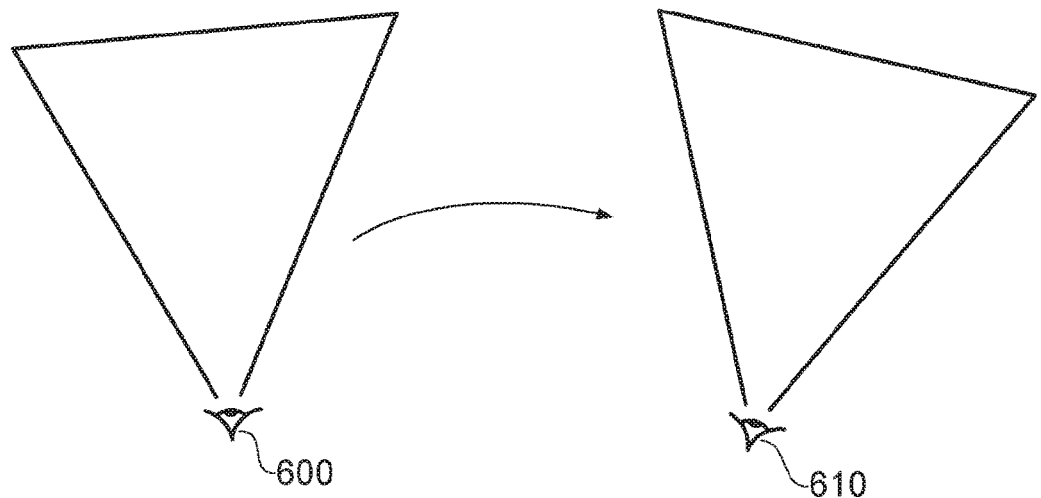

FIG. 14 schematically illustrates a latency issue with HMD image display. As discussed above, the position and/or orientation of an HMD can be used, for example as discussed with reference to FIG. 9, so that an image for display is rendered according to the detected position and/or orientation of the HMD. In the case of viewing a portion of a wider captured image, or generating a required image as part of computer game play, the arrangement discussed with reference to FIG. 9 involves detecting the current position and/or orientation of the HMD and rendering an appropriate image for display.

However, the latency involved in this process can lead to an incorrect image being generated.

Referring to FIG. 14, consider a situation in which the user's viewpoint is rotating (in a clockwise direction as illustrated schematically in FIG. 14) from a first viewpoint 600 to a second viewpoint 610, over the course of a time interval of the order of an image repetition period of the image displays used in the HMD (for example, ½5 second). Note that the two representations in FIG. 14 are shown side-by-side, but this is for the purposes of the drawing rather than necessarily indicating a translation of the user viewpoint (although some translation could be involved between the two viewpoints).

In order to allow time for the next output image to be rendered, the position and/or orientation of the HMD is detected when the HMD is at the viewpoint 600. The next image for display is then rendered, but by the time that image is actually displayed, the viewpoint has rotated to the viewpoint 610. The result is that the image is displayed is incorrect for the user's viewpoint 610 at the time that image is displayed. This can provide a subjectively poorer experience for the user, and may possibly lead to disorientation or even nausea on the part of the user.

Techniques which address this problem will now be discussed.

Figure 15:
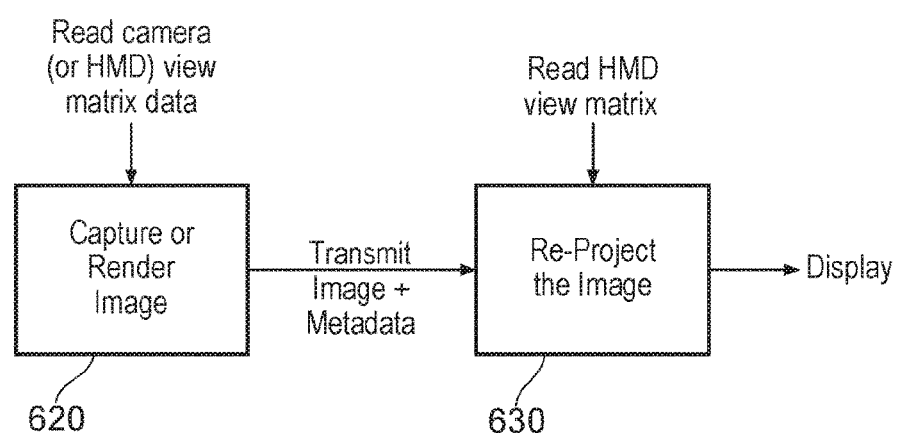

FIG. 15 is a schematic flow chart illustrating an image processing technique. The technique will first be discussed at a high level, and then more detail will be given below.

The features of the technique shown in FIG. 15 involve capturing or rendering an image (at a step of 620) according to the view matrix of the camera (in the case of a captured image) or the view matrix of the HMD (in the case of an image rendered by, for example, a computer game).

In the latter example, the image would be rendered according to the view matrix corresponding to the viewpoint 600 in FIG. 14. In other words, the technique involves detecting an initial position and/or orientation of the viewer's head and generating an image for display according to the detected position and/or orientation. The image is then transmitted or passed to the HMD along with metadata defining that view matrix (that is to say, the view matrix according to which the image was captured or first rendered). At the time of display, the HMD view matrix is again detected (in other words, detecting a current position and/or orientation of the viewer's head at a time at which the image is to be displayed) and, at a step 630, the image is re-projected based on the metadata indicating the original view matrix and the view matrix detected from the HMD at the time of display (in the terminology of FIG. 14, this would be the view matrix corresponding to the viewpoint 610, so that the technique involves associating metadata with the generated image, the metadata indicating the initial position and/or orientation of the viewer's head). So, the technique involves re-projecting the generated image according to any differences between the initial position and/or orientation and the current position and/or orientation of the viewer's head and displaying the re-projected image using the display.

In the case of a captured image, the view matrix of the camera is generally not within the control of the display arrangements and so this technique provides a way of compensating for differences between the two view matrices. In the case of image rendering, however, the issues are slightly different. However, a significant feature is that the time taken to process a re-projection operation can be much less than the time taken for a full rendering operation to generate an output image. In turn, this means that the rendering operation has to start earlier relative to the time of display which can lead to the latency problems with regards to detection of the appropriate viewpoint to use for the rendering operation, as discussed with reference to FIG. 14. By contrast, using the technique described with reference to FIG. 15, the rendering operation takes place relative to a viewpoint (such as the viewpoint 600) which is correct at the time that the rendering operation is initiated, but the viewpoint is then adjusted (to the viewpoint 610, for example) at the time of display. This avoids the need to try to predict the viewpoint 610 in advance, which could also lead to errors in the viewpoint, but provides an image for displayed to the user at the appropriate viewpoint corresponding to the display time. Accordingly, the technique can involve receiving an image and associated metadata, detecting a current position and/or orientation of the viewer's head at a time at which the image is to be displayed, re-projecting the received image according to any differences between the position and/or orientation indicated by the metadata and the current position and/or orientation of the viewer's head, and displaying the re-projected image.

In examples, the timing of the process can proceed as follows:

At a time $t_0$, the HMD view matrix data (representing the HMD's position at $t_0$) is detected. the step 620 is initiated and takes a period $T_{render}$.

At a time $t_0+T_{render}$, the required image has been rendered.

The image is then transferred to the HMD. This can take a period of zero or more seconds (the period would be zero if, for example, the image had been rendered at the HMD). But in general, a period $T_{delivery}$ is noted for the time taken to deliver the image to the HMD ready for display.

At a time $t_0+T_{render}+T_{delivery}$, the HMD view matrix data is again detected. This could correspond to the required display time, in which case (according to the derivation below) the image would be displayed late by an amount $T_{reproj}$, or it could be carried out at a time equal to a display time $T_{display}-T_{reproj}$. In either case it is carried out at a time dependent upon a required display time.

The image is then re-projected (at the step 630) to account for differences between the initial and the latest view matrices. The time period taken for the re-projection is $T_{reproj}$, assumed here to be much less than (or at least less than) $T_{render}$.

The image is then displayed at a time:

$$t_0+T_{render}+T_{delivery}+T_{reproj}.$$

Therefore, when the image is displayed, its maximum positional error corresponds to the movement of the HMD in the period $T_{reproj}$, whereas without the present technique, the maximum positional error corresponds to the movement of the HMD in the larger period $T_{render}+T_{delivery}$.

These are therefore examples of a generating step taking a period of time equal to at least an image generating latency, and a re-projecting step taking a period of time equal to at least an image re-projection latency, the image generating latency being longer than the image re-projection latency.

In the above examples, the detected initial position is detected at a latest time, allowing for the image generating latency and the image re-projection latency, to allow for the display of the re-projected image at the display time.

Worked examples of this technique will be discussed below.

Figure 16:
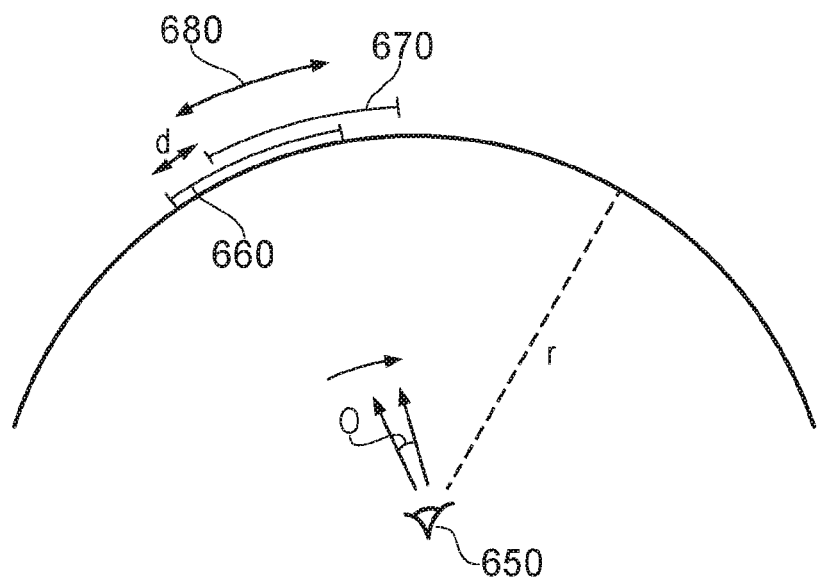

FIG. 16 schematically illustrates the rotation of an HMD viewpoint 650 in a clockwise direction.

Figure 17:
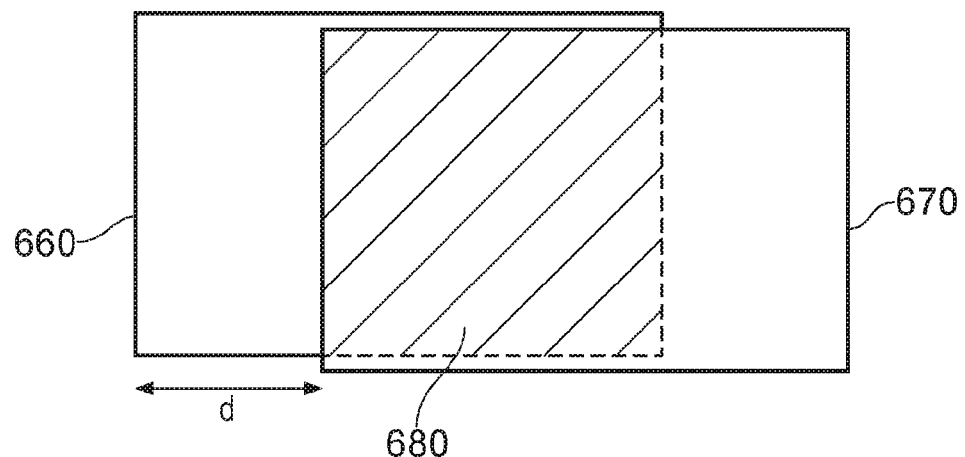

FIG. 16 is similar to FIG. 6 discussed above, in that the image for display is considered to lie on the surface of a sphere of radius r, where r is substantially equal to the distance from the user's eye to the virtual image generated by the HMD display system. Under this arrangement, a rotation of the viewpoint 650 by an angle θ can be considered as a lateral movement on the surface of the sphere of radius r by a lateral distance d. Such a displacement d is schematically illustrated in FIG. 17. If it is assumed that an image generated at the step 620 is represented by an image 660 in FIG. 16, and an image generated at this step 630 is represented by an image 670 in FIG. 16, it may be seen that the two images may be represented side-by-side from the point of view of the user. (Note that in FIG. 17, a small vertical displacement is shown just to allow the different images to be distinguished from one another in the drawing).

In a simple example, in order to generate (at the step 630) an appropriate image 670 for display to the user, a "subtraction" operation is carried out, which is a schematic term to illustrate the operation of detecting the overlap between the required display position of the image 670 and the actual position of the image 660, so as to display within the image 670 the overlapping portion 680 (shaded in FIG. 17) of the image 660. In other words, the re-projecting comprises detecting an overlapping portion between the generated image and the required re-projected image, and reproducing the overlapping portion as part of the re-projected image.

In embodiments of the present disclosure, the missing areas in the image 670 (those parts not shown as shaded) may be masked or filled in using image data from, for example, a panoramic image captured or prepared for this purpose and stored by the display arrangement. So, embodiments of the technique can therefore comprise filling portions of the re-projected image other than the overlapping portion with image material from a further image source.

Figure 18:
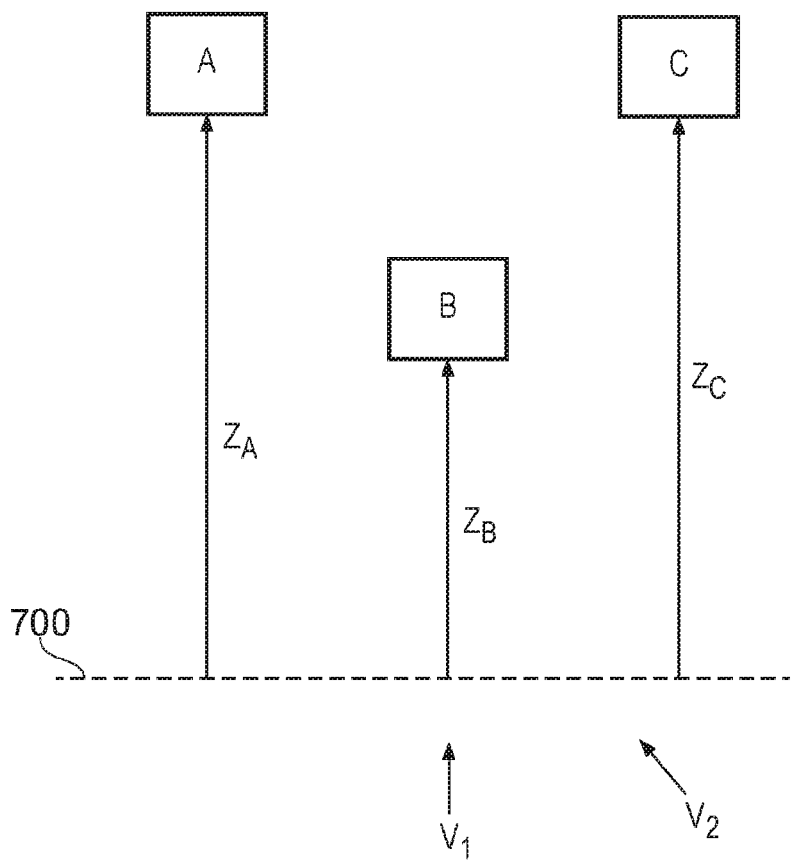

In order to re-project images by taking into account translations of the viewpoint, embodiments of the disclosure can use that information associated with the images. FIG. 18 schematically illustrates a depth map which may be derived, for example, from image data captured by a 3-D (binocular) camera or a so-called Z-camera, or which may be generated as part of the operation of a computer games machine's rendering engine.

In the schematic example of FIG. 18, three image objects labelled as objects A, B and C, are shown at respective image depths measured from an arbitrary depth position 700 of $z_A$, $z_B$ and $z_C$. Two potential viewpoints are shown, labelled as a viewpoint $v_1$ and a viewpoint $v_2$ respectively.

Figure 19:
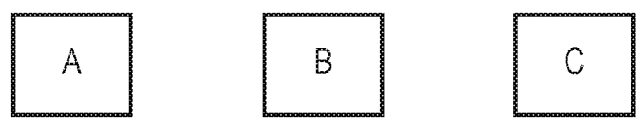
Figure 20:

FIGS. 19 and 20 schematically illustrate portions of images according to the viewpoint $v_1$ and the viewpoint $v_2$ respectively. At a rendering stage, the depth of each of the image objects is taken into account in generating the images. However, this technique can also be used at a re-projection stage such as that defined by the step 630 discussed above, so that image objects may be moved relative to one another in the re-projected image according to their respective image depths. Accordingly, the technique can involve providing depth data indicating the image depth of one or more image features, and the re-projecting can comprise repositioning one or more image features within the re-projected image according to the depth data.

Figure 21:
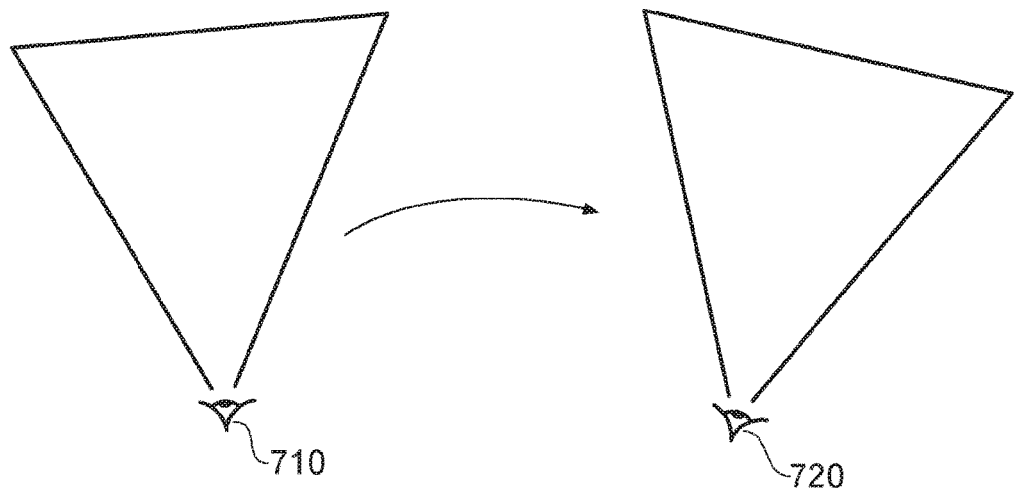

FIG. 21 schematically illustrates a technique for image rendering and re-projection to compensate for HMD motion. In a similar manner to FIG. 14, a user viewpoint moves or rotates from a viewpoint 710, detected as part of the step 620 of FIG. 15, to a viewpoint 720 detected as part of the step 630 of FIG. 15 and according to which the image for display is re-projected. In this way, an image according to the correct viewpoint 720 is displayed to the user.

In more detail, FIG. 22 is a schematic flowchart relating to the technique shown in FIG. 21. In FIG. 22, process steps 800, 810, 820, 830, 840 and 850 are shown. Of these, the steps 800, 810 and 820 correspond generally to the step 620 of FIG. 15. The remaining steps 830, 840 and 850 correspond generally to the step 630 of FIG. 15. Note that in some examples, each of the steps in FIG. 22 could be carried out immediately (or substantially immediately) in response to completion of the preceding step.

At the step 800, the current position of the HMD (corresponding to the position 710 of FIG. 21) is detected and, at the step 810, is stored (for example in a temporary working memory forming part of the HMD or the computer games machine). At the step 820, an image for display is rendered according to the viewpoint 710.

At the time at which the rendered image is to be displayed, or at a time interval t before the instant at which the image is to be displayed, where t is the length of time required for the re-projection operation, the HMD position is again detected at the step 830 which, in this example, will detect the position 720. The image for display is re-projected as discussed above at the step 840 and is displayed to the user at the step 850.

The timing of the steps could be in accordance with the example timings discussed above.

Figure 23:
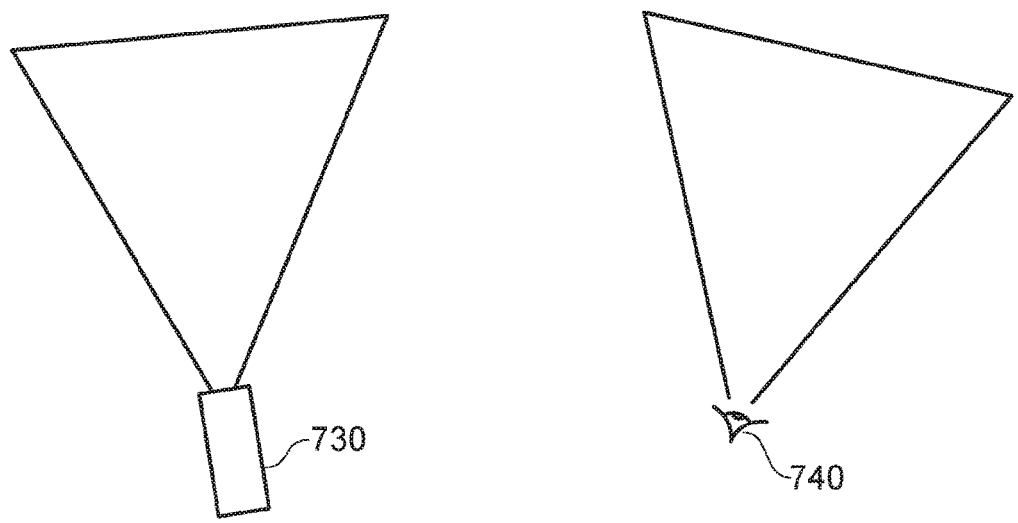

A similar example relating to captured images will now be discussed. FIG. 23 schematically illustrates a technique for image capturing and re-projection to compensate for different camera and HMD positions. In FIG. 23 a camera viewpoint 730 is different to an HMD viewpoint 740.

Figure 24:
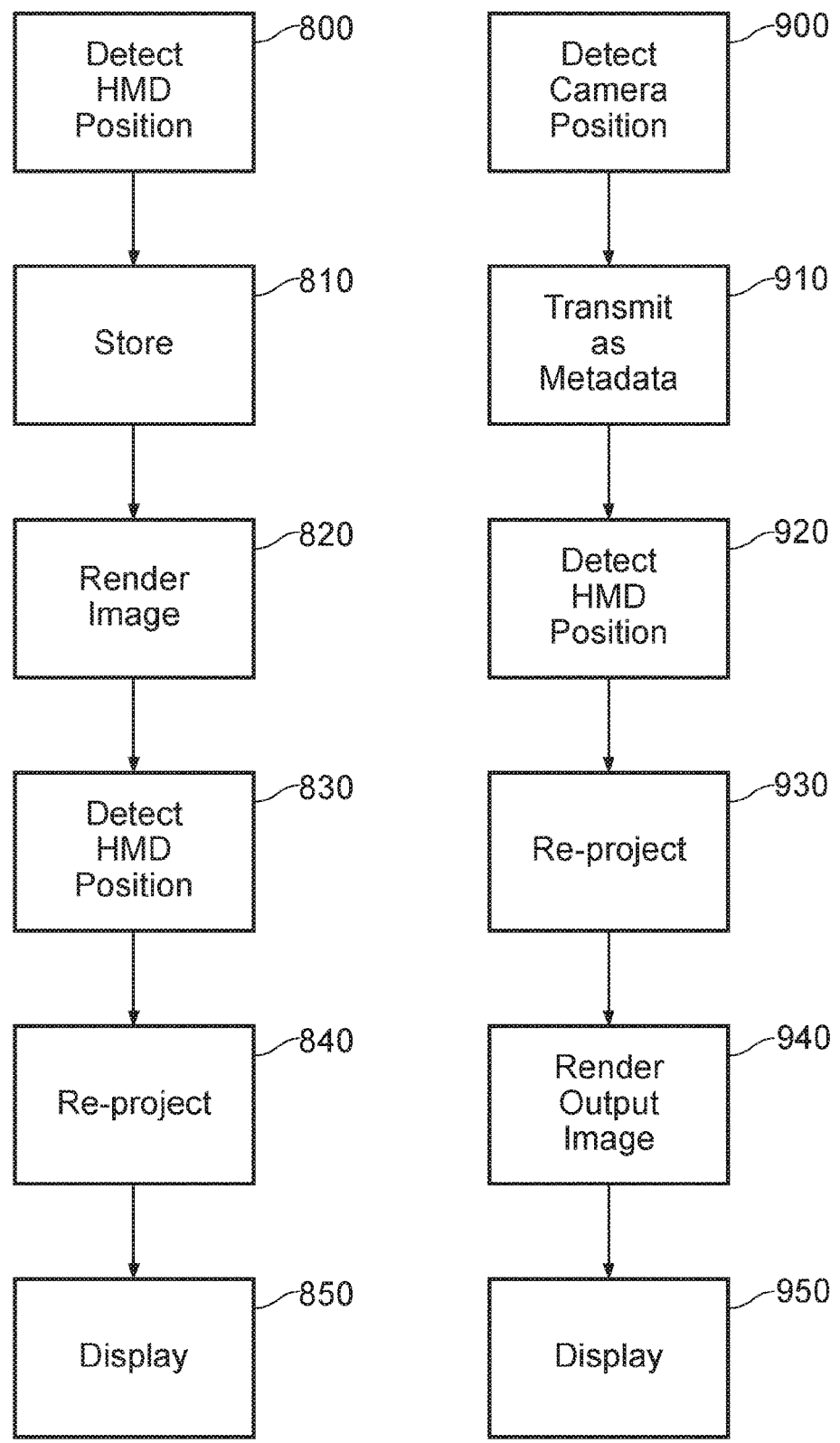

FIG. 24 is a schematic flowchart relating to the technique shown in FIG. 23.

In FIG. 24, process steps 900, 910, 920, 930, 940 and 950 are shown. Of these, the steps 900 and 910 correspond generally to the step 620 of FIG. 15. The remaining steps 920, 930, 940 and 950 correspond generally to the step 630 of FIG. 15.

At the step 900, the current position of the camera (corresponding to the position 730 of FIG. 23) is detected and, at the step 910, is transmitted as metadata along with the captured image.

At the time at which the image is to be displayed, or at a time interval t before the instant at which the image is to be displayed, where t is the length of time required for the re-projection operation, the HMD position is detected at the step 920 which, in this example, will detect the position 740. The image for display is re-projected as discussed above at the step 930 and is rendered (at the step 940) for display to the user at the step 950.

Figure 25:
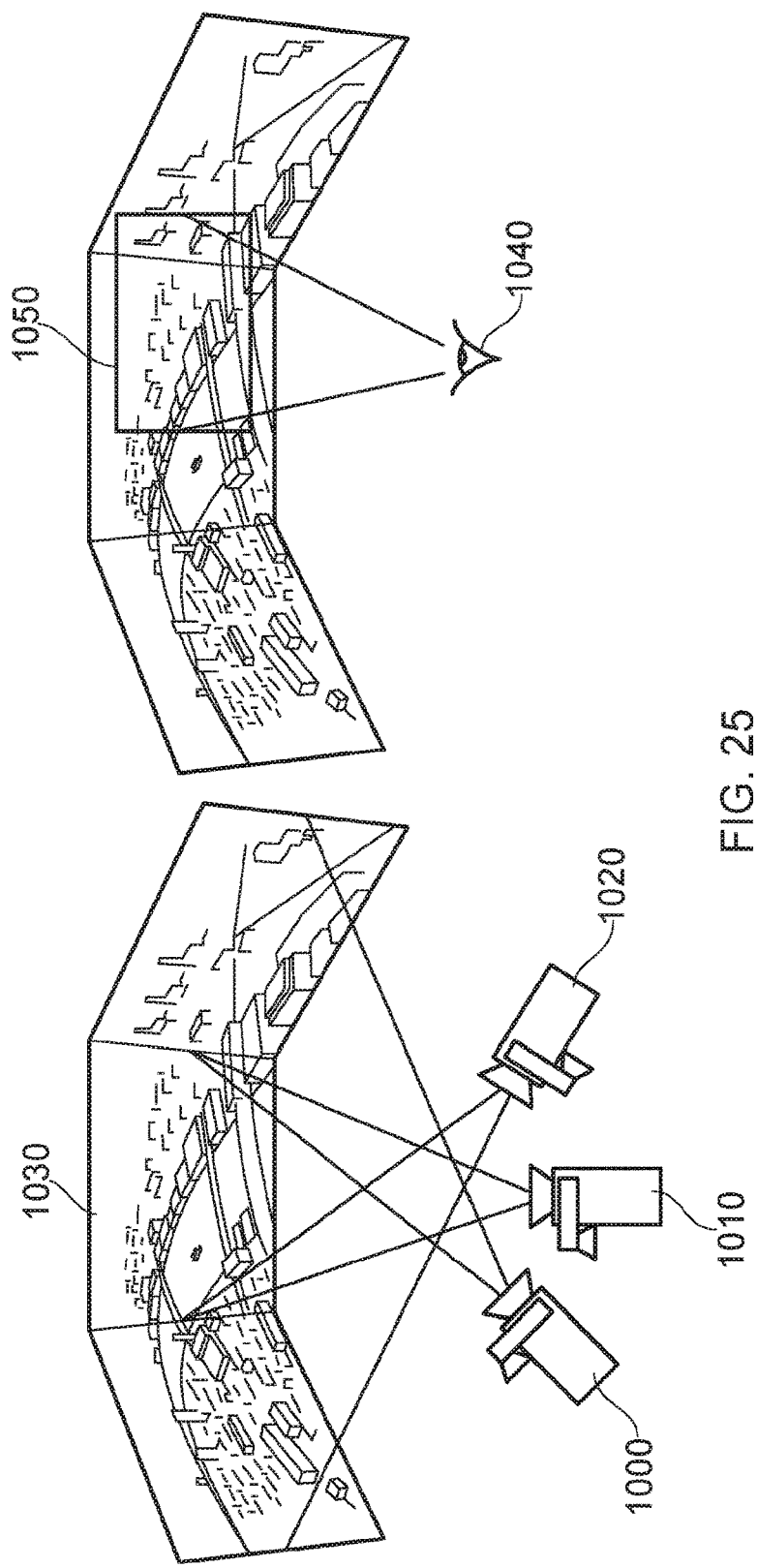

FIG. 25 schematically illustrates the viewing of a panoramic image 1030 formed by combining or stitching together images captured by respective cameras or camera positions 1000, 1010, 1020. Note that real cameras do not have to be involved; the panoramic image could be formed by stitching together multiple computer-generated images having different respective viewpoints. The viewpoint of each of the cameras, camera positions or virtual cameras used to capture the panoramic image is associated with the panoramic image or the respective image portion corresponding to that viewpoint as image metadata, in a similar manner to the step 910 discussed above. At the time of display, according to a user viewpoint 1040, an image 1050 for display is generated by re-projecting the respective image portions or the whole panoramic image according to the techniques discussed above.

Figure 26:
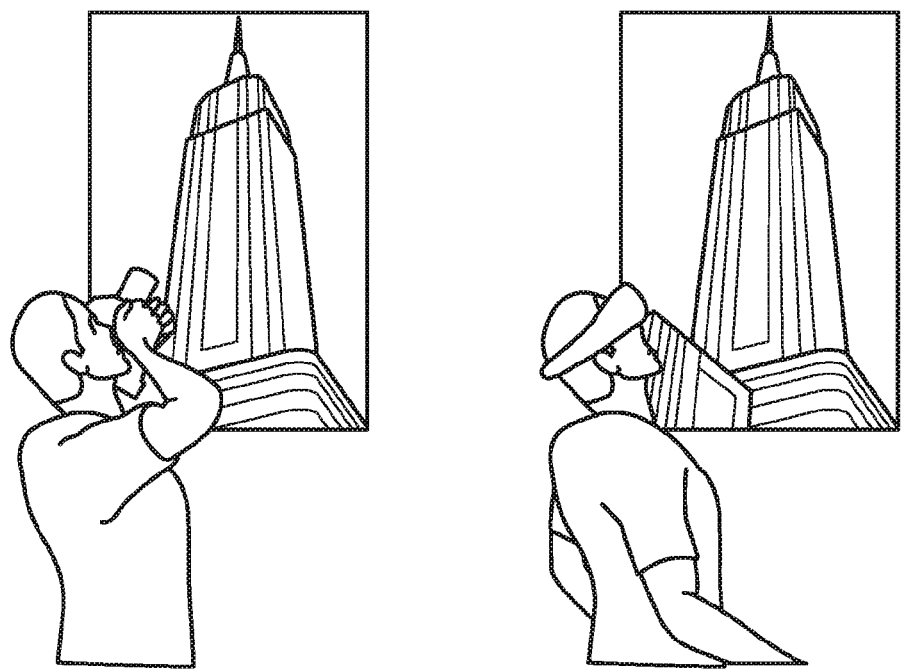

FIG. 26 schematically illustrates camera viewpoint adjustment in a displayed image, which can allow images to be reproduced at their original size and position relative to the viewer. The left side of FIG. 26 schematically illustrates a user capturing an image of (in this example) a tall building using a hand-held camera. As discussed above, the camera viewpoint is recorded and associated with the captured image as metadata. To the right of FIG. 26, a user is doing the captured image by an HMD. The captured image is re-projected according to the user's viewpoint using the techniques discussed above.

The data-processing operations described above may be carried out at the video signal source 80 (for example, a computer games machine) and/or the HMD (in terms of all of the steps of FIG. 22 and the steps 920 . . . 950 of FIG. 24). The division between processing at the HMD and processing at the source 80 is a matter for the system designer; it may be desirable to reduce the size, weight and power consumption of the HMD for user comfort, which would make it appropriate to move as much processing as possible to the source 80. Alternatively, in order to reduce the amount of data which needs to be transferred between the HMD and the source 80, some of the processing may take place entirely at the HMD. In either instance, the processing may be carried out by appropriate programmable hardware operating under software control, for example. The steps 900, 910 of FIG. 24 may be carried out by a camera or (in a similar manner to the discussion above) by apparatus associated with a camera. For the purposes of example, FIG. 27 schematically illustrates a camera 1100 having this functionality. In FIG. 27, the camera 1100 comprises a lens arrangement 1110, and image sensor 1120 arranged to receive light through the lens arrangement 1110 and convert the light into an image signal, a position, orientation and/or motion detector 1130, which may be of the types discussed above in connection with detecting the HMD's position, orientation and/or motion, and a processor 1140 operable to carry out at least the steps 900, 910 using data from the detector 1130 and to output an image signal 1150 having associated viewpoint metadata as discussed above. Note that if optical flow motion detection is used as described earlier, the image data for this process may be simply derived from the sensor 1120, so avoiding the need for a separate detector 1130.

According to at least some embodiments of the present disclosure, by the addition of extra data in a video signal, an immersive video display such as a head-mounted display (HMD), or multi-screen projector is capable of reproducing images life-sized and in their correct orientation to the viewer. For interactive applications, the image re-projection can be performed rapidly and at the latest time just before display. This can reduce unwanted image movement caused by rendering latency. For any application, this technique can stabilise camera motion reducing viewer sickness and maintains the real world orientation of objects, improving immersion and realism.

In at least some embodiments of the disclosure, a single HMD could be used to re-project both interactive content and broadcast TV signals using the same technology. Some frame borders may be seen if the viewer is looking in a different direction to the camera, though this could be mitigated using supplementary panoramic still images to fill the gaps.

Embodiments of the disclosure can also address issues relating to video captured by a shaky camera, for example by a hand-held camera or a camera subject to outside influences on its motion, such as a camera mounted on a mechanical device or in the path of wind currents. By associating metadata with the image (as discussed above) indicative of the motion of the camera during image capture, re-projection is performed at the time of display using the techniques described above. In this way, a central region of the image can be compensated for camera motion and appear steady to the viewer, though the outer border of the image may move around as a result of the compensation.

The embodiments described so far have related primarily to head mountable displays. Further arrangements will now be described in which the display or displays are not head mountable.

Figure 28:
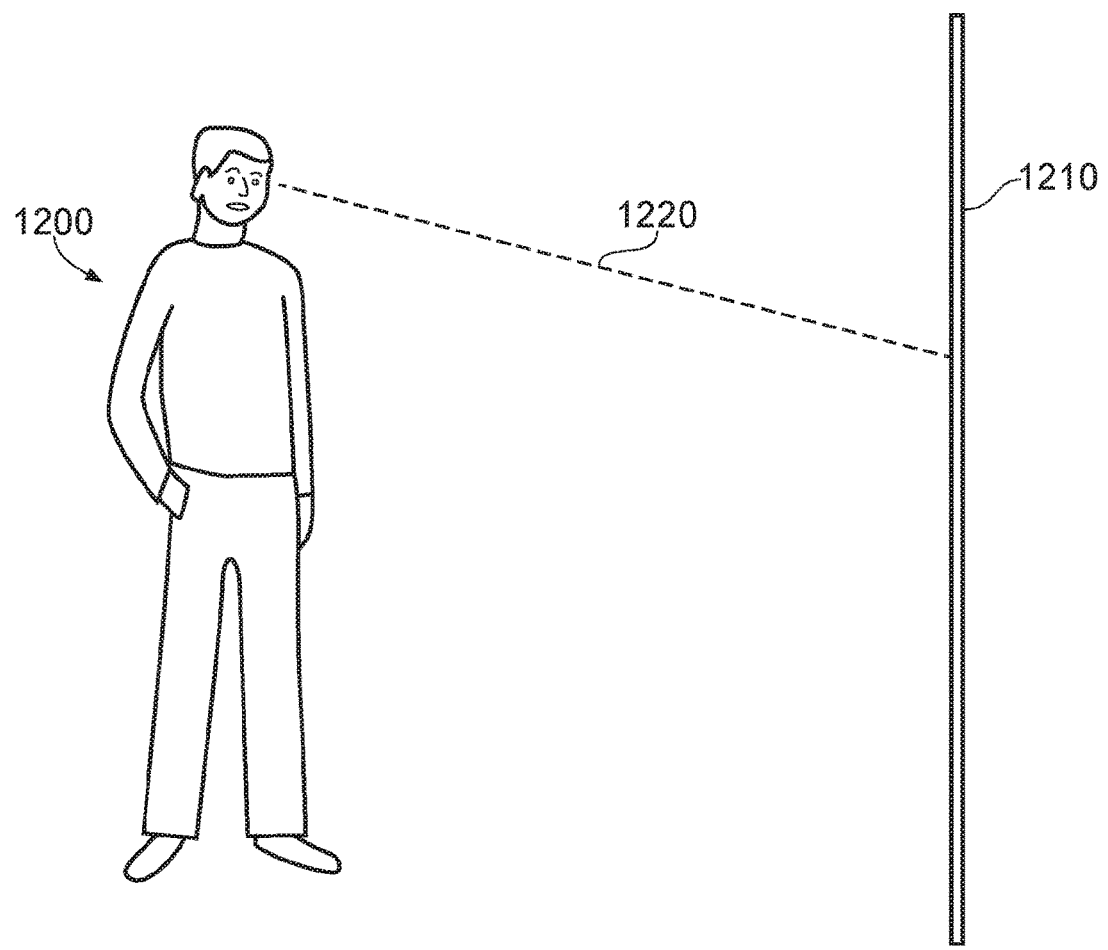

FIG. 28 schematically illustrates a viewer 1200 observing a display screen 1210. The display screen 1210 may be a forward-projection screen (in which case one or more projectors, not shown, may be positioned on the same side of the screen 1210 as the user), or a rear-projection screen (in which case one or more projectors, not shown, may be positioned on the other side of the screen to that of the user) or formed as one or more display panels such as liquid crystal display (LCD) panels. The skilled person will understand that the particular technology used to implement the display of images on the display screen 1210 is not material to the present embodiments.

Many of the techniques discussed above in connection with HMD devices can also be used equivalently in respect of the arrangement of FIG. 28. In the earlier discussion of HMD systems, the orientation of the HMD was detected by various techniques. A similar consideration in the arrangement of FIG. 28 involves the detection of the user's head orientation. It will be appreciated that the head orientation does not necessarily indicate the direction that the user is looking, but it is generally considered to indicate a good approximation of the direction of viewing 1220.

So, in some embodiments, the same techniques as discussed above (in connection with HMD systems) can be used in respect of a larger display 1210 and a detection of the user's head orientation. Various ways in which the head orientation can be detected will be discussed below.

Figure 29:
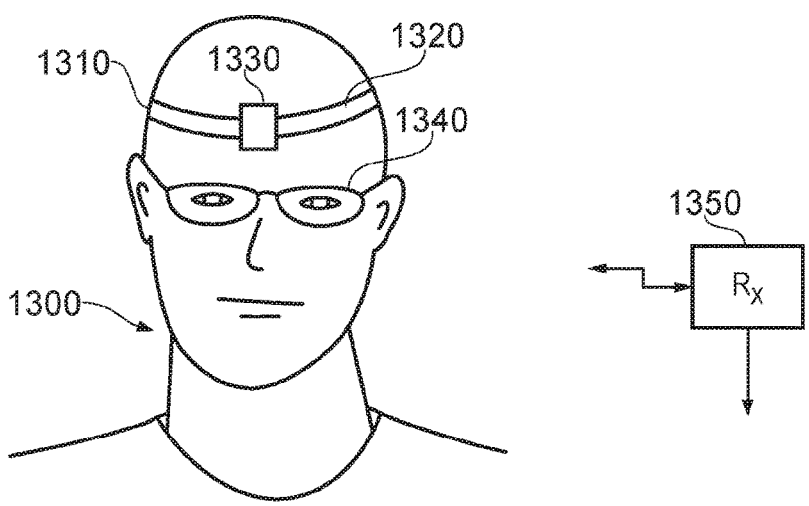

FIG. 29 schematically illustrates a user 1300 wearing a head orientation detector 1310. The head orientation detector 1310 is illustrated schematically as a headband 1320 and an orientation detector 1330 mounted on the headband. In practice, the arrangement could be made more discreet, for example been combined into a fitment attachable to a conventional pair of spectacles 1340 or forming part of a hat or pair of headphones.

Functionally, the orientation detector 1330 operates according to the techniques shown in FIG. 8 if all the various alternatives discussed earlier in connection with the description of FIG. 8. In this regard, the orientation detector 1330 encompasses much of the functionality of an HMD, but without the image display function.

The orientation detector 1330 may comprise a processor to derive an orientation from whichever data source it is using (for example, images of the ambient scene or accelerometer data), so that the orientation detector 1330 transmits data indicative of the orientation to a receiver 1350, for example by a wireless link such as a Bluetooth link. Of course, a wired link could be used instead. Alternatively, the orientation detector 1330 may transmit "raw" acquired data, such as captured images of the surroundings or raw data from an accelerometer to the receiver 1350, so that the receiver 1350 (or a further downstream processing device, not shown) derives orientation information from the raw data received from the orientation detector 1330.

Figure 30:
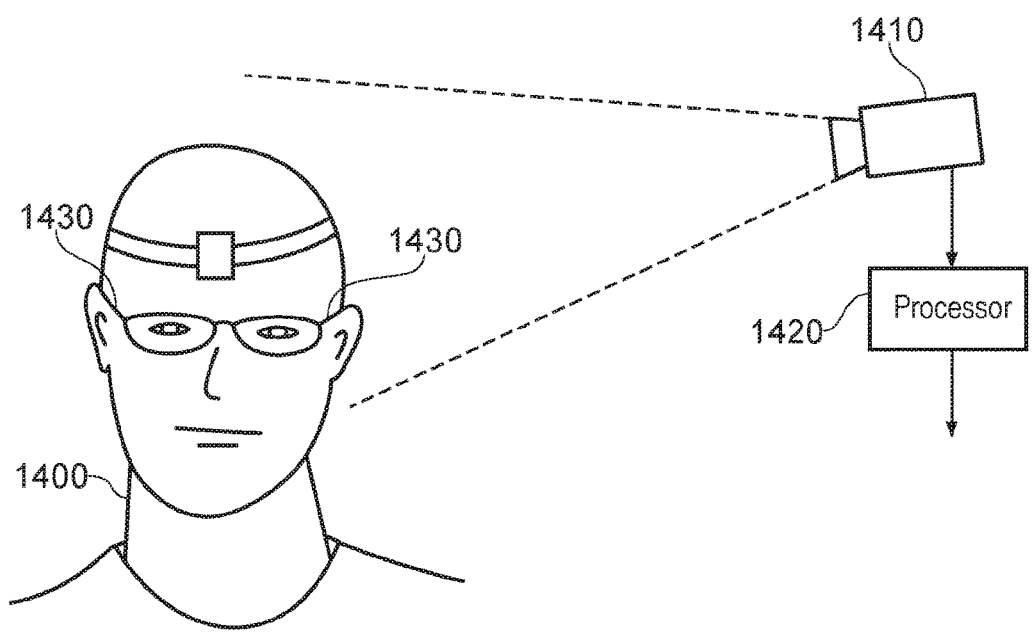

FIG. 30 schematically illustrates a passive head orientation detection technique. This arrangement does not necessarily require the user in 1400 to wear or carry any particular equipment or items. A video camera 1410 captures images of the user 1400 and passes the images to a processor 1420. The processor 1420 can operate in various ways. In one example, the processor 1420 can apply known face-detection techniques to detect the orientation of the news's face with respect to the camera 1410. For example, such techniques may involve comparing an image portion containing the user's face (normalised to a standard scale) to various Eigen images each indicative of characteristics of a face at a different orientation relative to the camera. The closest match amongst the Eigen images may be taken to be indicative of the current orientation of the user's face. The processor 1420 may be calibrated with information defining the relative orientation of the camera 1410 and the display screen in use, so as to be able to provide an output which is indicative of a current orientation of the user's face relative to the display screen.

In another example, the user may wear one or more passive markers such as a reflective or retro reflective marker (not shown in FIG. 30) to assist the processor 1420 in the detection of the orientation of the user's face relative to the camera. For example, if the side arms 1430 of the user's spectacles were provided with different (that is to say, distinguishable by the camera 1410) reflective markers, the relative size in the captured image of the respective markers could be processed to provide an indication of the orientation of the user's face. Optionally, the camera 1410 may comprise a source of illumination arranged to eliminate the markers. Optionally, the illumination may be invisible or substantially invisible to the user, for example infrared illumination.

Figure 31:
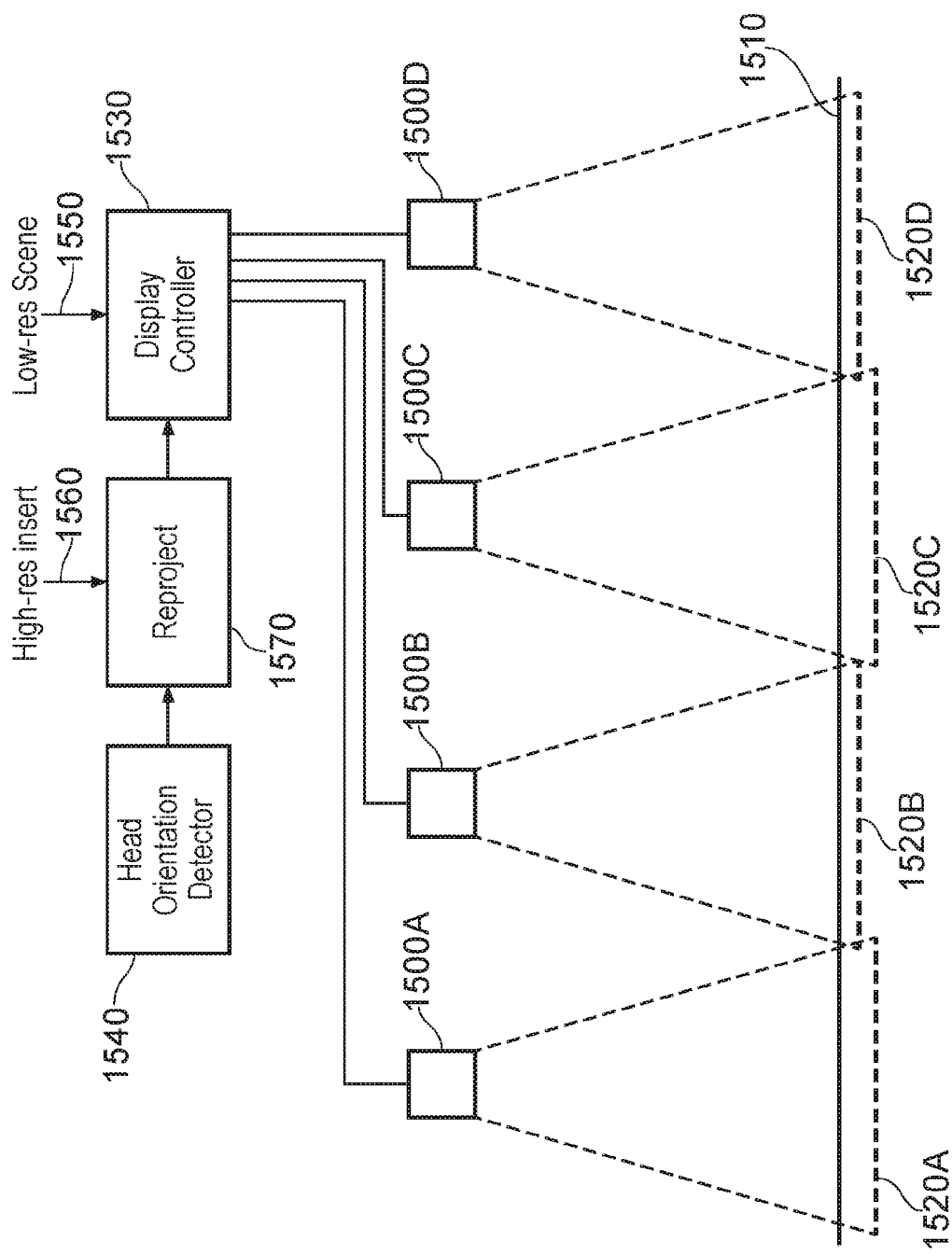

FIG. 31 schematically illustrates a display arrangement using multiple projectors.

In FIG. 31, four projectors are provided by way of example, namely projectors 1500A, 1500B, 1500C and 1500D. The projectors have respective fields of view which together encompass the whole of the display screen 1510. The respective fields of view are indicated schematically by respective dashed lines 1520A-D which, for the sake of the drawing, are shown behind the projector screen. In fact, of course, the important area to consider is the extent of the projection at the plane of the projector screen 1510.

The four projectors are driven by a display controller 1530 which provides a respective display signal to each of the projectors 1500 A-D. The formation of the signals will now be discussed.

With reference to a viewer (not shown in FIG. 31) observing the display screen 1510, a head orientation detector 1540 is arranged to detect the orientation of the viewer's head with reference to the display screen 1510. The various techniques discussed above are suitable for this detection. Also as discussed above, this provides an indication of the direction in which the viewer is looking. The aim of the system shown in FIG. 31 is that a lower-resolution background scene provided by an image signal 1550 is displayed across the whole of the display screen 1510, but a higher resolution insertion image provided by an image signal 1560 is superimposed so as to replace a part of the lower resolution background scene. (If the viewer's head orientation is not detected, a fixed head position—not uncommon in a simulator environment—could be assumed)

Figure 32:
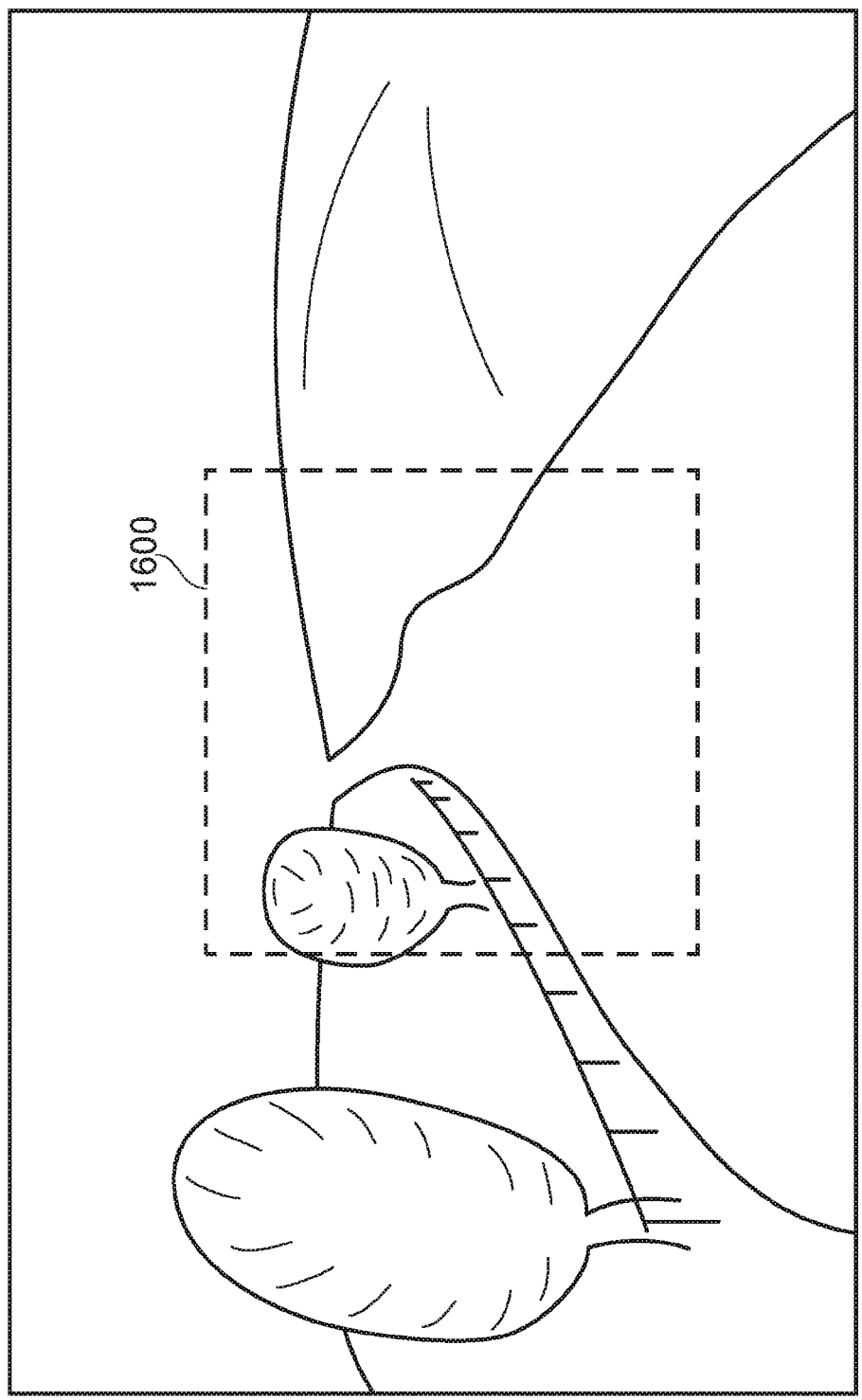

An example is schematically illustrated in FIG. 32, which might form part of a video or a videogame relating to driving along a road surrounded by trees (shown very schematically in FIG. 32). Here, a background scene is generated and displayed at a lower resolution than an insertion image 1600 which is generated and displayed at a higher resolution. The insertion image 1600 relates to parts of the overall scene which the user will be concentrating on, namely (in this example) the road immediately ahead and any oncoming vehicles. The remaining background image (after insertion of the insertion image) relates to other parts of the overall scene which are less important to the user's attention. One reason why this disparity in image resolution is used is because of the high processing overhead in generating an overall scene covering the entire display at a high resolution. Instead, the background may be generated at a lower resolution (and may be arranged so as to change less frequently than the insertion image) so as to save on processing overhead.

Note that the dashed lines indicating the extent of the insertion image 1600 are simply for clarity of the drawing and would not be present in an actual displayed image.

Returning to FIG. 31, the insertion image represented by the signal 1560 is re-projected by re-projection logic 1570 at an appropriate image display position according to the detected head orientation of the viewer. The re-projected insertion signal is supplied to the display controller which combines it at the appropriate display position with the lower resolution background scene represented by the signal 1550.

A similar arrangement to that of FIG. 31 could refer to television coverage of a sports event or the like. The background display could be, for example, an image of an entire sports pitch (although not necessarily all of the sports pitch may be displayed at one time to the user). the insertion image to be re-projected into the main display is a shot from a camera which is following the sports action, for example, movements of a player. The insertion image is re-projected to the appropriate position in the background image using the metadata and techniques described above. This provides the viewer with an indication of where, in the context of the whole pitch, the action is taking place.

Embodiments of the present disclosure could use non-changing parts (or parts of a certain colour or texture, perhaps representing a view of grass) of the re-projected image to populate the background image as the re-projected image moves around as part of the above process. In some examples, a low resolution background image could be populated with higher resolution image material representing the sports pitch by copying from the re-projected image as it moves around. If multiple camera views are available (as is the case with some broadcasters' coverage of sporting events and the like) then (a) the user could select one or more such views to be re-projected, and (b) this would allow a faster population of the background image, by taking material from more than one such view.

In other examples, if a depth map or other depth data were provided with the background and insertion images, the user could move around the overall scene in three dimensions, with re-projection being adjusted in response to the user's virtual position.

A further example relates to a video game, such that the overall background image could represent some or all of a virtual world. The scene relating to specific game action by a player is re-projected into the correct position within the virtual world as the insertion image.

Figure 33:
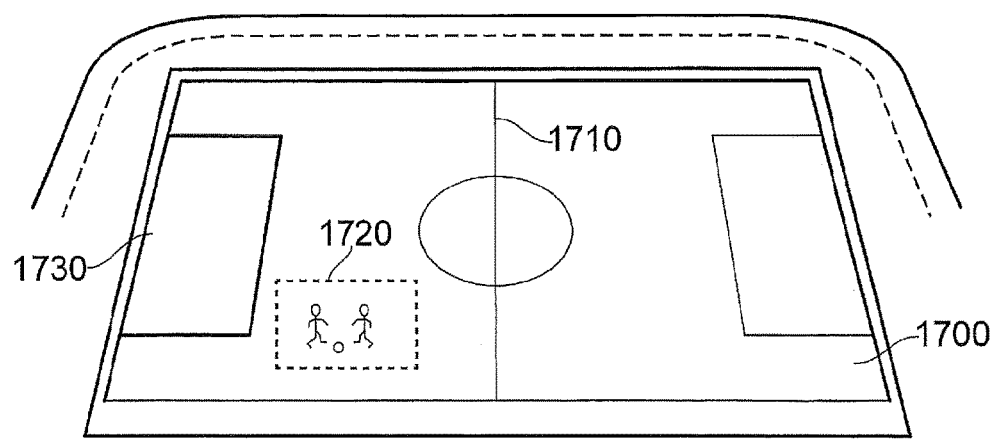

FIG. 33 schematically illustrates a display of a sports event. In this example, the camera covering the sports event is situated centrally overlooking the sports pitch 1700, generally in line with one end of the halfway line 1710. The process illustrated with respect to FIG. 33 is similar in some ways to that described with reference to FIG. 32 above. A panoramic view of some or all of the sports pitch 1700 is held at a display system such as a television receiver or at an HMD system (acting as a receiver of the video content relating to coverage of the sports event). The panoramic view was captured from the same viewpoint as that of the camera, for example by combining images generated by panning the same camera around the view of the entire sports pitch. The panoramic view was supplied to the HMD system before coverage of the sports event started.

A current view 1720 captured by the camera is re-projected into the panoramic image at a position dependent upon the current orientation of the camera. In other words, the view 1720 and the action taking place in that view appear (once re-projected) at the correct portion of the sports pitch 1700. As the camera pans around following the sports action, the position at which the camera view 1720 is re-projected correspondingly changes. If the camera zooms, this will also be reflected in the view matrix data associated with the camera and the re-projection of the image 1720 will be adjusted to correspond to the newly zoomed camera operation. For example, if the camera changes its zoom level so that its field of view is reduced, the size of the re-projected view 1720 with reference to a constant-sized panoramic view of the sports pitch 1700 will be correspondingly reduced.

Many sports events are covered by several different cameras. For example, even though a camera situated at a position level with the halfway line can see action taking place on most or all of the sports pitch, it may be preferable to switch to a camera situated near a goalmouth 1730 at times when action near the goalmouth is taking place. Accordingly, the system can store multiple panoramic images, a respective one being associated with each camera position. By including metadata associated with the view matrix data which defines the particular camera in current use, the appropriate panoramic can be selected at the HMD system in order that re-projection takes place into the correct panoramic image. Note that in some systems, multiple camera views are broadcast in respect of sports coverage or the like, leaving it to the user to select a desired camera view. In this type of arrangement, also, the panoramic associated with the selected camera view is used.

Figure 34:
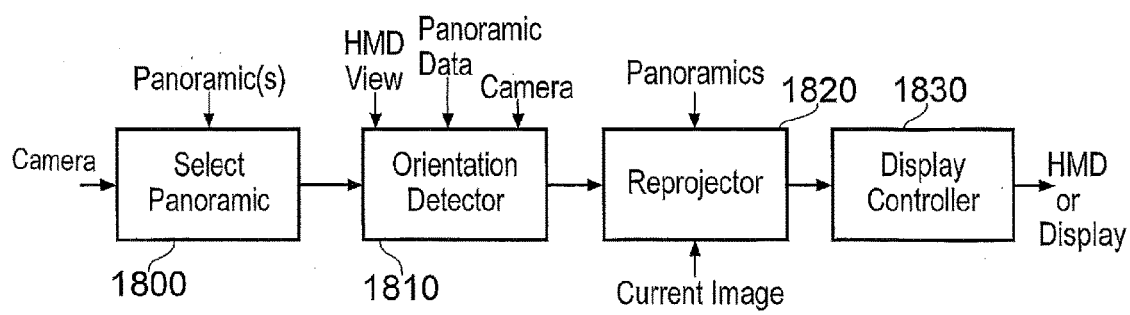

FIG. 34 schematically illustrates apparatus for generating the display of FIG. 33.

A panoramic image selector 1800 operates in the situation as discussed above where multiple camera views each have their own respective panoramic image, to select the appropriate panoramic image for the camera view currently in use. To achieve this, the panoramic image selector 1800 receives data, for example extracted from metadata received with the video content currently being displayed, defining which camera is in use, and accesses data representing each of the available panoramic images. The panoramic image selector can pass the selected panoramic image to the next stage of processing or, alternatively, can pass data defining which panoramic image should be used.

An orientation detector 1810 operates in the manner discussed above, to detect the current orientation of the camera in use from its view matrix data. In the case that the display is via an HMD, the orientation detector 1810 can also detect the current view orientation of the HMD. The orientation detector 1810 also receives data defining the point of view of the currently selected panoramic image. From these data, the orientation detector 1810 determines parameters for re-projection of the current image from the camera into the panoramic image.

A re-projection device 1820 re-projects the current image received from the camera into the selected panoramic image according to parameters supplied by the orientation detector.

A display controller 1830 provides or generates an output image for display by the HMD or the display device.

Figure 35:
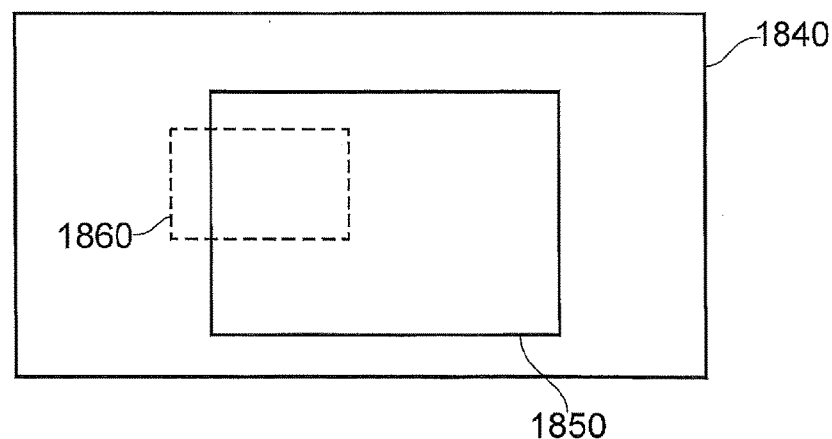

FIG. 35 schematically illustrates overlapping viewpoints. Here, merely for clarity of the discussion, a simpler view is used than the isometric presentation provided in FIG. 33. The extent of the selected panoramic image is indicated by a rectangle 1840. Within that extent, a rectangle 1850 schematically represents the extent of the field of view of the HMD according to its current orientation. A broken line rectangle 1860 indicates the field of view of the camera expressed in the frame of reference of the panoramic image. So, in the case that the HMD has a limited field of view with reference to the full panoramic image, both the HMD field of view and the currently selected camera field of view are re-projected into the frame of reference of the panoramic image 1840 so that the image content viewable by the HMD, in this example part of the panoramic image and a part of the camera image, is determined by the overlap of the HMD field of view and the re-projected panoramic and camera image.

Figure 36:
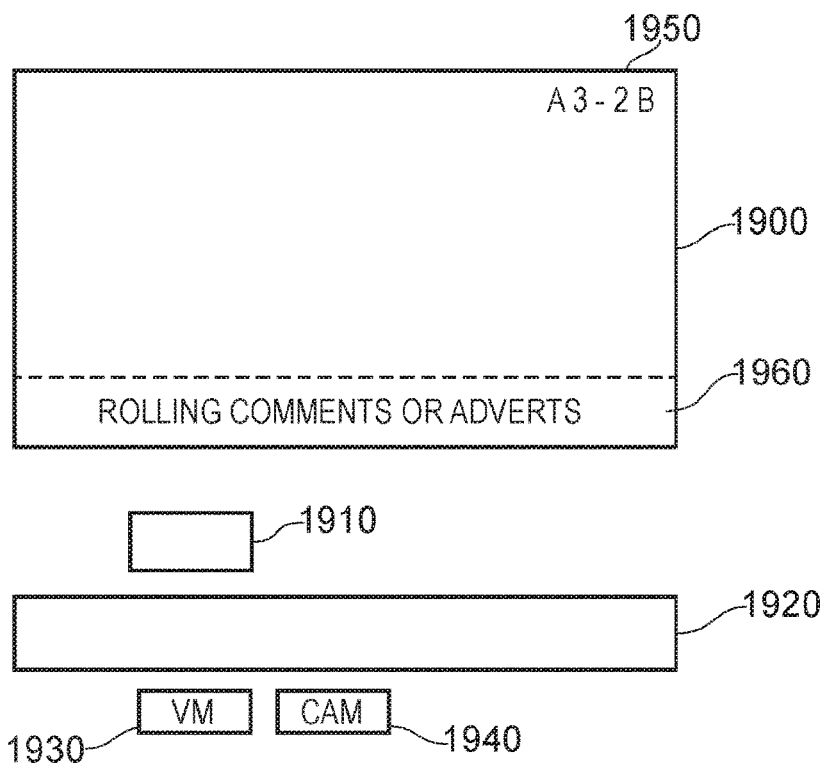
Figure 37:
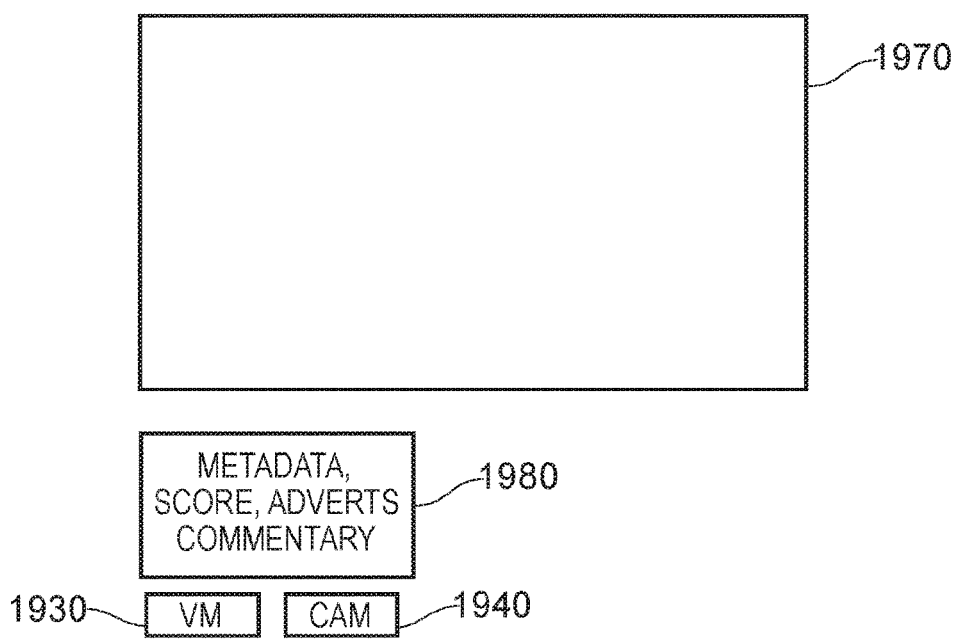

FIGS. 36 and 37 schematically illustrate examples of image data with associated metadata.

Both FIGS. 36 and 37 address an issue which can occur in respect of some video content such as sports coverage. Referring to FIG. 36, the set of data associated with a camera image comprises the image itself 1900, replacement pixel data 1910, 1920, view matrix data 1930 and data identifying the camera currently in use 1940.

Most of the image content in the image 1900 is not shown, for clarity of the diagram, but significant features include a match score 1950, which in this example (a match between team A and team B) is displayed at the upper right corner of the image 1900, and an information bar 1960, for example containing rolling comments and/or advertisements. When the image 1900 is viewed on a conventional display screen, such that the image 1900 fills the display screen, the position of the score data 1950 and the rowing commentary and adverts 1960 can be entirely appropriate. However, if the image 1900 is re-projected into a panoramic image, in the manner discussed with reference to FIG. 33, then the position of these items can be wholly inappropriate as they will appear in the middle of the sports pitch.

The sports broadcasters may be unwilling to remove these data items from the image as broadcast, because the image may well be viewed on legacy equipment which does not provide re-projection. So, the sports broadcaster may be keen for users of such legacy equipment to see the score and rolling information in the information bar.

To address this, FIG. 36 provides additional metadata associated with the image 1900, in particular, a pair of blocks of pixel data 1910, 1920 which can be reinserted into the image 1900 to mask the score 1950 and the information bar 1960 respectively. In particular, the box 1910, 1920 are simply copies of the pixel content at the image positions of the score 1950 and information bar 1960 in the originally captured image, that is to say before the score 1950 and information bar 1960 were superimposed over the image. The box 1910, 1920 can be accompanied by coordinates indicating, for example, the upper left corner of the image area which can be replaced by the respective block.

Another approach is provided in FIG. 37, in which an image 1970 is sent in a "clean" form, which is to say that it such as a score and an information bar are not included in the image, but these are provided by separate metadata 1980 so that they can be reinserted by the receiver and display.

FIGS. 38 and 39 are schematic flowcharts illustrating processes for using the metadata of FIGS. 36 and 37. In particular, FIG. 38 relates to a possible use of the metadata of FIG. 36, and FIG. 39 relates to a possible use of the metadata of FIG. 37.

Referring to FIG. 38, at a step 2000 image content relating to graphical material such as the score 1950 and the information bar 1960 is replaced at the display or HMD system by respective masking data provided, in this example, as the blocks 1910, 1920. At a step 2010, the required view is determined (corresponding to the operation of the orientation detector 1810 discussed above) and at a step 2020 re-projection takes place, corresponding to the operation of the re-projector 1820 discussed above. This allows re-projection to take place into the panoramic image without inappropriately placed graphical items appearing in the re-projected image. Optionally, at a step 2030, the image content which was replaced at the step 2000 can be reinserted into the re-projected image, for example at predetermined positions relative to the display viewpoint.

Referring to FIG. 39, which relates to the image data provided in FIG. 37, the steps 2010 and 2020 correspond to those described above. At a step 2040, image content defined by or generated from the metadata 1980 is inserted into the re-projected image, for example at predetermined positions relative to the display viewpoint.

FIG. 40 is a schematic flowchart illustrating a further use of the metadata of FIG. 37. In the case that the metadata includes data defining, for example, which player currently has possession of the ball, or which players are currently on the field, for which players are currently shown in the field of view of the camera, at a step 2050 the display controller 1830 can process the metadata to extract items which, at a step 2060 are indicated to the user. Example items might include the name of the player currently in possession of the ball, which can be displayed above the re-projected camera image 1720.

FIG. 41 is a schematic flowchart illustrating the updating of a panoramic view. As discussed earlier, the panoramic views can be sent in advance of the broadcast or other transmission of the sports coverage, but there may be a need to update them during progress of the sports match. At a step 2070, the display controller 1830 detects non-moving (non-player) portions of the camera image 1720 and, at a step 2080, updates the panoramic view at that image position according to the detected non-moving portions. For example, this could be a simple replacement of the corresponding portions of the panoramic view, or a filtering process could be used so that, for example, each time such a non-moving portion is detected, the panoramic view at that pixel position is updated to a new pixel value equal to:

$$(k \times \text{previous pixel value}) + ((1-k) \times \text{detected non-moving pixel value})$$

where k is a filter coefficient, for example equal to 0.97.

Note that the techniques discussed above relating to data associated with sports coverage can be extended to various other systems, for example other types of television coverage (news, music shows and the like) or to game systems in which, for example, the image 1720 might be generated by an in-game (virtual) camera having a virtual rather than a real camera position and orientation, and might include game score data, weapon aiming articles such as cross-hairs and the like. Using the techniques discussed with reference to FIGS. 36-39, these can either be removed before re-projection and then reinserted, or they can be supplied separately and inserted at the appropriate display position after re-projection.

Accordingly, embodiments of the present disclosure as discussed above in the various examples may be summarised and/or defined by the following numbered clauses:

1. A display method using a display operable to display an image to a viewer, the method comprising:

detecting an initial position and/or orientation of the viewer's head;

generating an image for display according to the detected initial position and/or orientation;

detecting a current position and/or orientation of the viewer's head depending upon a display time at which the image is to be displayed;

re-projecting the generated image according to any differences between the initial position and/or orientation and the current position and/or orientation of the viewer's head; and displaying the re-projected image using the display.

2. A method according to clause 1, in which the step of re-projecting comprises detecting an overlapping portion between the generated image and the required re-projected image, and reproducing the overlapping portion as part of the re-projected image.

3. A method according to clause 2, comprising filling portions of the re-projected image other than the overlapping portion with image material from a further image source.

4. A method according to any one of the preceding clauses, in which the generating step comprises associating metadata with the generated image, the metadata indicating the initial position and/or orientation of the viewer's head.

5. A method according to any one of the preceding clauses, in which the generating step comprises providing depth data indicating the image depth of one or more image features, and the step of re-projecting comprises repositioning one or more image features within the re-projected image according to the depth data.

6. A method according to any one of the preceding clauses, in which the display is a head-mountable display and the position and/or orientation of the viewer's head is detected by detecting a position and/or orientation of the head-mountable display.

7. A method according to any one of the preceding clauses, in which the generating step takes a period of time equal to at least an image generating latency, and the re-projecting step takes a period of time equal to at least an image re-projection latency, the image generating latency being longer than the image re-projection latency.

8. A method according to clause 7, in which the detected initial position is detected at a latest time, allowing for the image generating latency and the image re-projection latency, to allow for the display of the re-projected image at the display time.

9. A method of image capture comprising:
  capturing an image using a camera;
  detecting the position and/or orientation of the camera; and
  associating metadata with the captured image, the metadata indicating the position and/or orientation of the camera at the time of capture of the image.

10. A display method for displaying an image to a viewer, the method comprising:
  receiving an image and associated metadata as captured by the method of clause 9;
  detecting a current position and/or orientation of the viewer's head at a time at which the image is to be displayed;
  re-projecting the received image according to any differences between the position and/or orientation indicated by the metadata and the current position and/or orientation of the viewer's head; and displaying the re-projected image.

11. A method according to clause 10, comprising the step of combining the re-projected image with a panoramic image representing a panoramic field of view from the position of the camera.

12. A display method for displaying an image to a viewer, the method comprising:
  receiving an image and associated metadata indicating the position and/or orientation of a camera at the time of capture or generation of the image;
  re-projecting the received image relative to a panoramic image representing a panoramic field of view from that camera position; and
  displaying the image as re-projected into the panoramic image.

13. A method according to clause 11 or clause 12, comprising the step of selecting a panoramic image according to the camera used or the camera position of the image.

14. A method according to any one of clauses 11 to 13, comprising the step of:
  removing graphical data from the image.

15. A method according to clause 14, comprising the step of:
  inserting graphical information for display, after re-projection of the image.

16. A method according to any one of clauses 10 to 15, in which the image is displayed using a head-mountable display and the position and/or orientation of the viewer's head is detected by detecting a position and/or orientation of the head-mountable display.

17. Computer software for carrying out a method according to any one of the preceding clauses.

18. A storage medium by which computer software according to clause 17 is stored.

19. A display system comprising:
  a display element observable by a viewer;
  a position and/or orientation detector for detecting position and/or orientation of the viewer's head;
  an image re-projector for re-projecting a received image for display by the display element according to any differences between the position and/or orientation applicable to the generation or capture of the image and the current position and/or orientation of the viewer's head.

20. A system according to clause 19, comprising a video signal source for generating an image for display according to an initial position and/or orientation of the viewer's head.

21. A system according to clause 20, in which the video signal source is a video gaming or data processing machine.

22. A system according to clause 19, in which the image re-projector is responsive to metadata associated with an image received from a camera, the metadata indicating the position and/or orientation of the camera at the time of image capture.

23. A system according to any one of clauses 19 to 22, in which the position and/or orientation detector comprises:
  a camera mounted so as to move with the user's head; and
  an image comparator operable to compare successive images captured by the camera so as to detect inter-image motion.

24. A system according to any one of clauses 19 to 22, in which the position and/or orientation detector comprises an accelerometer.

25. A system according to any one of clauses 19 to 22, in which the display element forms part of a head-mountable display having a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer.

26. A system according to clause 25, in which, in use, the virtual image is generated at a distance of more than one meter from the frame.

27. A camera apparatus comprising:
  an image capture device for capturing an image;
  a position and/or orientation detector for detecting the position and/or orientation of the camera apparatus at the time of capture of the image; and
  a metadata generator for associating metadata with the image, the metadata indicating the detected position and/or orientation of the camera apparatus at the time of capture of the image.

28. Image data defining an image, the image data having associated metadata defining the position and/or orientation of a camera by which the image was generated and defining one or more replaceable portions of the image for the display of graphical data relating to the image.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A display method using a display device operable to display an image to a viewer using a head-mountable display, the display method comprising:
   detecting at least one of an initial position or orientation of the viewer's head;
   rendering, by one or more processors, an image for display according to the at least one of the detected initial position or orientation to define a viewpoint of the viewer that is correct at a time that the rendering is initiated;
   detecting at least one of a current position or orientation of the viewer's head depending upon a display time at which the rendered image is to be displayed, the at least one of the current position or orientation being used to define a viewpoint of the viewer appropriate to the display time;
   re-projecting, by one or more processors, the rendered image according to any differences between the at least one of the detected initial position and orientation and the at least one of the current position or orientation of the viewer's head, to perform a viewpoint adjustment of the rendered image to the viewpoint of the viewer appropriate to the display time; and
   displaying the re-projected image using the head-mountable display at the display time;
   in which the step of re-projecting comprises detecting an overlapping portion between the rendered image and the re-projected image, and reproducing the overlapping portion as part of the re-projected image, wherein the method further comprises filling portions of the re-projected image other than the overlapping portion with image material from a further image source.

2. The method according to claim 1, in which the rendering step comprises associating metadata with the rendered image, the metadata indicating the at least one of the initial position or orientation of the viewer's head.

3. The method according to claim 1, in which the rendering step comprises providing depth data indicating image depth of one or more image features, and the step of re-projecting comprises repositioning selected ones of the one or more image features within the re-projected image according to the depth data.

4. The method according to claim 1, in which the at least one of the position or orientation of the viewer's head is detected by detecting at least one of a position or orientation of the head-mountable display.

5. The method according to claim 1, in which the rendering step takes a period of time equal to at least an image generating latency, and the re-projecting step takes a period of time equal to at least an image re-projection latency, the image generating latency being longer than the image re-projection latency.

6. The method according to claim 5, in which the detected initial position is detected at a latest time, allowing for the image generating latency and the image re-projection latency, to allow for the display of the re-projected image at the display time.

7. A display method for displaying an image to a viewer, the method comprising:
   receiving an image and associated metadata, wherein:
      the image is captured using a camera,
      at least one of the position or orientation of the camera is detected, and
      the metadata is associated with the captured image, the metadata indicating the at least one of the position or orientation of the camera at a time of capture of the image;
   detecting at least one of a current position or orientation of the viewer's head at a time at which the image is to be displayed;
   re-projecting, by at least one processor, the received image according to any differences between the at least one of the position or orientation indicated by the metadata and the at least one of the current position or orientation of the viewer's head; and
   displaying the re-projected image;
   in which the re-projecting comprises detecting an overlapping portion between the received image and the re-projected image, and reproducing the overlapping portion as part of the re-projected image, wherein the method further comprises filling portions of the re-projected image other than the overlapping portion with image material from a further image source.

8. The method according to claim 7, comprising the step of combining the re-projected image with a panoramic image representing a panoramic field of view from the position of the camera.

9. A display method for displaying an image to a viewer, the method comprising:
   receiving an insertion television image and associated metadata indicating at least one of a position or orientation of a television camera at a time of capture or generation of the insertion television image;
   re-projecting, by at least one processor, the received television insertion image to a display position dependent upon a current orientation of the camera, the display position being relative to a panoramic image representing a panoramic field of view from that camera position;
   generating an output image for display to the viewer by replacing a part of the panoramic image with the re-projected insertion television image according to the display position dependent upon the current orientation of the camera; and
   displaying the output image to the viewer.

10. The method according to claim 8, further comprising selecting a panoramic image according to the camera used or the camera position of the image.

11. The method according to claim 8, further comprising removing graphical data from the image.

12. The method according to claim 11, further comprising inserting graphical information for display after re-projection of the image.

13. The method according to claim 7, in which the image is displayed using a head-mountable display and the at least one of the position or orientation of the viewer's head is detected by detecting at least one of a position or orientation of the head-mountable display.

14. A non-transitory computer-readable storage medium storing computer readable instructions there, the instructions, when executed by one or more processors, cause the processors to perform a display method, the method comprising:
   detecting at least one of an initial position or orientation of a viewer's head;
   rendering an image for display according to the at least one of the detected initial position or orientation to define a viewpoint of the viewer that is correct at a time that the rendering is initiated;

detecting at least one of a current position or orientation of the viewer's head depending upon a display time at which the rendered image is to be displayed, the at least one of the current position or orientation being used to define a viewpoint of the viewer appropriate to the display time;

re-projecting the rendered image according to any differences between the at least one of the initial position and orientation and the at least one of the current position or orientation of the viewer's head to perform a viewpoint adjustment of the rendered image to the viewpoint of the viewer appropriate to the display time; and displaying the re-projected image to the viewer at the display time using a head-mountable display;

in which the re-projecting comprises detecting an overlapping portion between the rendered image and the re-projected image, and reproducing the overlapping portion as part of the re-projected image, wherein the method further comprises filling portions of the re-projected image other than the overlapping portion with image material from a further image source.

15. A head-mountable display system comprising:
a display element observable by a viewer;
a detector device configured to detect at least one of a position or orientation of the viewer's head; and
an image re-projector configured to re-project a received image for display by the display element according to any differences between the at least one of the position or orientation applicable to generation or capture of the image and at least one of a current position or orientation of the viewer's head, the image re-projector configured to re-project the received image to a viewpoint of the viewer appropriate to a time of display;
in which the image re-projector is configured to detect an overlapping portion between the received image and the re-projected image, to reproduce the overlapping portion as part of the re-projected image, and to fill portions of the re-projected image other than the overlapping portion with image material from a further image source.

16. The system according to claim 15, further comprising a video signal source configured to generate an image for display according to at least one of an initial position or orientation of the viewer's head.

17. The system according to claim 16, in which the video signal source is a video gaming or data processing machine.

18. The system according to claim 15, in which the image re-projector is responsive to metadata associated with an image received from a camera, the metadata indicating at least one of a position or orientation of the camera at the time of image capture.

19. The system according to claim 15, in which the detector device comprises:
a camera mounted so as to move with the user's head; and
an image comparator configured to compare successive images captured by the camera so as to detect inter-image motion.

20. The system according to claim 15, in which the detector device comprises an accelerometer.

21. The system according to claim 15, in which the display element forms part of the head-mountable display system having a frame arranged to be mounted onto an viewer's head, the frame defining one or two eye display positions which, in use, are positioned in front of a respective eye of the viewer and a respective display element is mounted with respect to each of the eye display positions, the display element being configured to provide a virtual image of a video display of a video signal from a video signal source to the respective eye of the viewer.

22. The system according to claim 21, in which, in use, the virtual image is generated at a distance of more than one meter from the frame.

23. The display method according to claim 9, further comprising populating the panoramic image from non-changing parts of the insertion image as the insertion image moves with respect to the panoramic image.

* * * * *